(12) United States Patent
Smith

(10) Patent No.: US 11,321,358 B2
(45) Date of Patent: May 3, 2022

(54) SYSTEM FOR PROCESSING RESOURCE DATA USING CHARACTER FIT OBJECTS

(71) Applicant: Todd Thomas Smith, Austin, TX (US)

(72) Inventor: Todd Thomas Smith, Austin, TX (US)

( * ) Notice: Subject to any disclaimer, the term of this patent is extended or adjusted under 35 U.S.C. 154(b) by 182 days.

(21) Appl. No.: 16/678,085

(22) Filed: Nov. 8, 2019

(65) Prior Publication Data

US 2020/0387525 A1     Dec. 10, 2020

Related U.S. Application Data

(60) Provisional application No. 62/856,825, filed on Jun. 4, 2019.

(51) Int. Cl.
*G06F 16/00* (2019.01)
*G06F 16/28* (2019.01)

(52) U.S. Cl.
CPC .......... *G06F 16/285* (2019.01); *G06F 16/289* (2019.01)

(58) Field of Classification Search
CPC .............................. G06F 16/285; G06F 16/289
USPC ........................................................ 707/738
See application file for complete search history.

(56) References Cited

U.S. PATENT DOCUMENTS

| | | | |
|---|---|---|---|
| 2007/0255576 A1* | 11/2007 | Patterson | G06Q 30/02 705/1.1 |
| 2008/0097941 A1* | 4/2008 | Agarwal | G06F 16/951 706/12 |
| 2012/0095819 A1* | 4/2012 | Li | G06Q 30/02 705/14.23 |
| 2012/0264511 A1* | 10/2012 | Marsland | A63F 13/533 463/31 |
| 2013/0132386 A1* | 5/2013 | Runchey | G06F 16/367 707/736 |
| 2017/0235848 A1* | 8/2017 | Van Dusen | G06F 30/20 705/12 |

* cited by examiner

*Primary Examiner* — Alexandria Y Bromell

(57) ABSTRACT

A system is described for processing resource data using character fit objects. A character fit object associates a degree of fit between a character object, a resource object, and a category object. A character object can reflect a viewpoint, budget, or affiliation and can be used alone or in combination with other character objects. A resource object can represent a physical object, a service, or data. Character fit objects can be used to track the accuracy and reliability of fit determinations over time.

4 Claims, 13 Drawing Sheets

SYSTEM FOR PROCESSING RESOURCE DATA USING CHARACTER FIT OBJECTS

CROSS-REFERENCE TO RELATED APPLICATIONS

The present applications claims priority to the earlier filed provisional application having Ser. No. 62/856,825, and hereby incorporates subject matter of the provisional application in its entirety.

FIELD OF INVENTION

The present disclosure relates to processing resource data. More specifically, the present disclosure includes sorting, filtering, and matching resource data using character fit objects.

BACKGROUND

A background is provided for introductory purposes and to aid the reader in understanding the detailed description. The background should not be taken as an admission of any prior art claims.

Some computer systems allow users to search for and filter resource data (e.g. data relating to physical objects, services, or data) using categories, locations, and keywords, such as resource name and resource traits. Some computer systems also allow users to sort or filter search results according to user ratings. However, these computer systems can be insufficient for processing resource data in an efficient, reliable, and private manner.

Computer systems relying on user ratings can be unreliable because user ratings may be submitted by users who are malicious, inexperienced, biased, or unreasonable. In addition, self-selection bias may occur because many users do not routinely rate resources or do so only when they have an exceptionally negative or exceptionally positive experience.

Furthermore, the existence of millions of raters on thousands of different websites and applications makes tracking the reliability of an individual's ratings extremely difficult; an extremely large number of raters acts as a barrier to accountability.

Ratings may also be unreliable because users have different approaches to rating resources. Some users may take an objective approach, rating each resource according to an objective standard (i.e. how a hypothetical reasonable person would view the product). Other users may take a subjective approach, rating each resource according to his or her own subjective experience (i.e. how the resource makes the user "feel"). In addition, users may have different understandings about how ratings should be distributed. Some users may take a bell-curve approach to rating resources, meting out very high or very low scores sparingly and giving a large number of ratings in the middle range. Other users may take a binary approach, rating most products as either "great" or "horrible."

Resource data processing based on artificial intelligence (e.g., automatically showing a user matches for products or services based on the user's past online behavior) raise privacy concerns because these techniques may utilize a user's emails, texts, search history, and other personal communications and behaviors. In many cases, users may not know that their data is being monitored or may reluctantly accept the loss of their privacy believing that more private options do not exist.

In addition, ratings may also be unreliable because users can have different viewpoints that are obfuscated when ratings are averaged together. For example, a businessperson will look for different traits in a hotel than a vacationing parent with young children would. If the hotel is excellent for business (e.g. well-appointed conference rooms, quiet hallways, downtown location, etc.), it may not be child-friendly (e.g. no swimming pool, somber color scheme, no nearby activities for children, etc.). If this is the case, a businessperson may rate the hotel "five stars" (highest rating), while a parent may rate the hotel "1 star" (fair rating) even though there are no technical problems with the hotel. When these ratings are averaged together, the result will be "3 stars" (good rating). From the averaged-together rating, the businessperson would not know that the hotel is perfect for business, and the parent would not know that the hotel is inappropriate for children.

Furthermore, because many computer systems for processing resource data do not consider viewpoint, they must return a large number results in order to satisfy large groups of users (who, of course, have different viewpoints). Each user then must sift through a large number of irrelevant results in order to find items that match the user's viewpoint.

Therefore, what is needed is a system for processing resource data that is reliable, accountable, pro-privacy, viewpoint-capable, and efficient. Accordingly, applicant's invention addresses these issues by providing a system for processing resource data using character fit objects that yields reliable and efficient results while maintaining users' privacy, facilitating accountability, and providing the ability to process resource data according to viewpoint.

SUMMARY OF THE INVENTION

Some aspects feature a computer system comprising: one or more computer readable storage devices and one or more processors. The one or more computer readable storage devices are configured to store: a plurality of category objects; a plurality of character objects; a plurality of resource objects; a plurality of character fit objects, and a plurality of computer-readable instructions. The one or more processors are configured to execute the plurality of computer-readable instructions to cause the computer system to perform operations comprising: receiving from a user a selected category object selected from the plurality of category objects; receiving from the user a selected character object selected from the plurality of character objects; identifying a first set of character fit objects from the plurality of character fit objects based on each character fit object in the set of character fit objects being linked to both the selected category object and the selected character object; ordering the character fit objects in the set of character fit objects according to fit degree; and for each character fit object in the set of character fit objects: displaying one or more properties of the character fit object; identifying one or more resource objects, from the plurality of resource objects, that are linked to the character fit object; and displaying one or more properties of each of the identified one or more resource objects.

Some other aspects feature one or more computer readable storage devices configured to store: a plurality of category objects; a plurality of character objects; a plurality of resource objects; a plurality of character fit objects; a plurality of computer-readable instructions; and one or more processors configured to execute the plurality of computer-readable instructions. The one or more processors are configured to execute the plurality of computer-readable instructions to cause the computer system to perform operations comprising: receiving from a user a selected category object selected from the plurality of category objects; receiving from the user a first selected character object selected from the plurality of character objects; receiving from the user a second selected character object selected from the plurality of character objects; identifying a first set of character fit objects from the plurality of character fit objects based on each character fit object in the first set of character fit objects being linked to both the selected category object and the first selected character object; identifying a second set of character fit objects from the plurality of character fit objects based on each character fit object in the second set of character fit objects being linked to both the selected category object and the second selected character object; identifying a set of matched character fit object pairs by matching fit objects in the first set of character fit objects with fit objects in the second set of character fit objects based on matching resource and category properties; determining a composite fit degree for each matched character fit object pair in the set of matched character fit object pairs; ordering the matched character fit object pairs according to their composite fit degrees; and for each matched character fit object pair in the set of matched character fit object pairs: displaying one or more properties of the matched character fit object pair; identifying one or more resource objects, from the plurality of resource objects, that are linked to the matched character fit object pair; and displaying one or more properties of each of the identified one or more resource objects.

Some other aspects feature one or more computer readable storage devices configured to store: a plurality of category objects; a first plurality of character objects; a second plurality of character objects; a plurality of resource objects; a plurality of character fit objects, a plurality of computer-readable instructions; and one or more processors configured to execute the plurality of computer-readable instructions. The one or more processors are configured to execute the plurality of computer-readable instructions to cause the computer system to perform operations comprising: receiving from a user a selected category object selected from the plurality of category objects; receiving from the user a first selected character object selected from the first plurality of character objects; receiving from the user a second selected character object selected from the second plurality of character objects; identifying a first set of character fit objects from the plurality of character fit objects based on each character fit object in the first set of character fit objects being linked to both the selected category object and the first selected character object; identifying a second set of character fit objects from the plurality of character fit objects based on each character fit object in the second set of character fit objects being linked to both the selected category object and the second selected character object and having a fit degree that is greater than a predefined value; identifying a set of matched character fit object pairs by matching fit objects in the first set of character fit objects with fit objects in the second set of character fit objects based on matching resource and category properties; ordering the matched character fit object pairs according to a fit degree associated with a character fit object in the matched character fit object pairs, wherein the character fit object in the matched character fit object pairs is associated with the first set of character fit objects; and for each matched character fit object pair in the set of matched character fit object pairs: displaying one or more properties of the matched character fit object pair; identifying one or more resource objects, from the plurality of resource objects, that are linked to the matched character fit object pair; and displaying one or more properties of each of the identified one or more resource objects.

Some other aspects feature one or more computer readable storage devices configured to store: a plurality of category objects; a first plurality of character objects; a second plurality of character objects; a plurality of resource objects; a plurality of character fit objects, a plurality of offer objects; a plurality of computer-readable instructions; and one or more processors configured to execute the plurality of computer-readable instructions. The one or more processors are configured to execute the plurality of computer-readable instructions to cause the computer system to perform operations comprising: receiving from a user a selected category object selected from the plurality of category objects; receiving from the user a first selected character object selected from the first plurality of character objects; receiving from the user a second selected character object selected from the second plurality of character objects; identifying a set of character fit objects from the plurality of character fit objects based on each character fit object in the set of character fit objects being linked to both the selected category object and the first selected character object; identifying a set of resource objects from the plurality of resource objects based on each resource object in the set of resource objects being linked to a character fit object in the set of character fit objects; identifying a set of offer objects from the plurality of offer objects based on each offer object in the set of offer objects being linked to a resource object in the set of resource objects and to the second selected character; identifying a second set of character fit objects comprising character fit objects from the first set of character fit objects that match offer objects in the set of offer objects based on matching resource and category properties; ordering the second set of character fit objects according to fit degree; for each character fit object in the second set of character fit objects, displaying one or more properties of the character fit object; identifying one or more resource objects, from the plurality of resource objects, that are linked to the character fit object; and displaying one or more properties of each of the identified one or more resource objects.

Various embodiments of the computer system can include one, all, or any combination of features of this paragraph. Each character object in the plurality of character objects can reflect a viewpoint. Each character object in the plurality of character objects can reflect a budget. Each character object in the plurality of character objects can reflect an affiliation.

Various embodiments of the present disclosure provide improvements to various technologies and technological fields. For example, as described above, existing data storage and processing technology is limited in various ways (e.g., they do not contemplate character viewpoint and character fit and do not allow the reliability of fit determinations to be easily tracked), and various embodiments of the disclosure provide significant improvements over such technology. Because various embodiments of the disclosure can take into account viewpoint, the number of objects processed, as well as the number of results returned to users, can be significantly smaller than those processed and returned by systems that do not consider viewpoint. In systems that do not contemplate viewpoint, a large number of results must be returned in order to satisfy large groups of users with different viewpoints; a user must sift through a large number of irrelevant results in order to find items that match the user's viewpoint. In the disclosed system, after a viewpoint character is selected, character fit objects can be limited to those linked to the selected viewpoint character, resulting in more efficient and faster processing and more relevant and focused results for users to review. In addition, various embodiments of the disclosure enhance accountability because character objects allow users to track the reliability of a character fit determinations over time. Further, various embodiments of the disclosure enhance privacy because character objects can be used to process resource objects without the use of personally identifiable information.

DETAILED DESCRIPTION OF THE INVENTION

Overview

Figure 1:
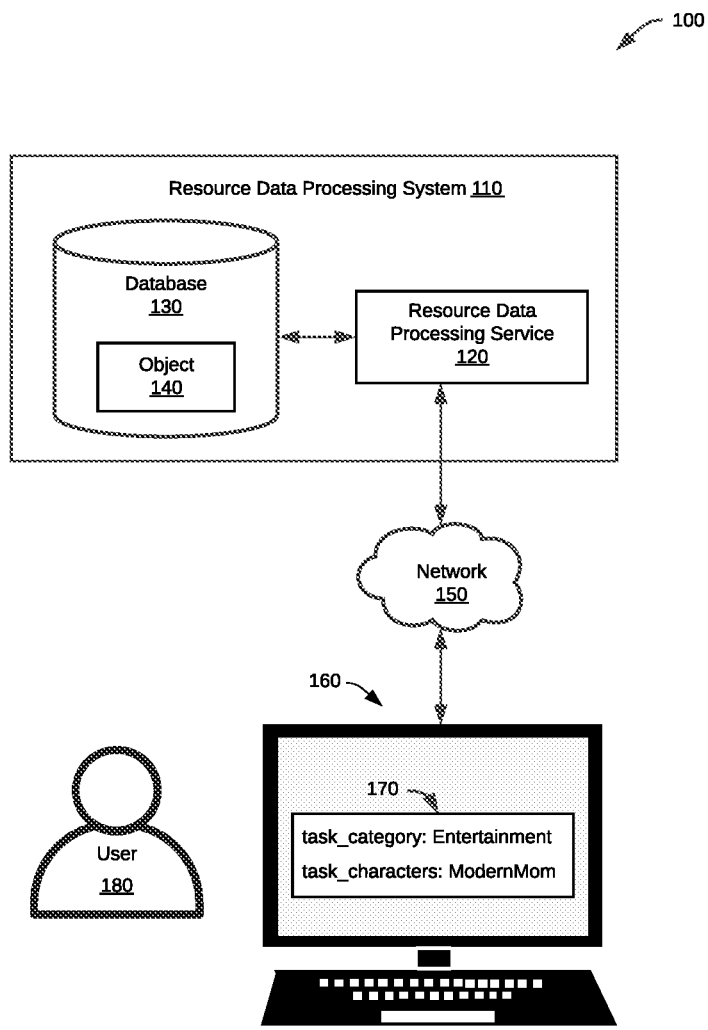
FIG. 1 shows an example block diagram showing the transmission of a resource data processing task to a resource data processing system

A resource data processing system can be used to process resource data using characters and character fit information. The resource data processing system can use objects to represent characters, resources, categories, and character fits. A user can define a resource data processing task by identifying a category object and one or more character objects. The resource data processing system can determine character fit objects that are linked to both the selected category object and selected character object. The system can determine resource objects that are linked to the character fit object and can determine media objects that are linked to those resource objects. The system can display resource, media, and fit data for each character fit object with character fit objects ordered according to fit degree.

Using character objects and character fit objects for resource data processing tasks results in several improvements and benefits. Because the disclosed resource data processing system can take into account viewpoint, the number of objects processed, as well as the number of results returned to users, can be significantly smaller than those processed and returned by systems that do not consider viewpoint. After a viewpoint character is selected, character fit objects can be limited to those linked to the selected viewpoint character, resulting in more efficient and faster processing and more relevant and focused results for users to review.

In addition, character objects allow resource objects to be processed without the use of personally identifiable information. A user can select a character instead of providing personal information or allowing his or her online communications and behavior to be tracked. Character objects also allow users to track the reliability of a character fit determinations over time.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Category: a category groups resources together; categories can include class categories (e.g. MEXICAN RESTAURANTS, ELECTRIC RAZORS, etc.), list categories (e.g. FUN SUMMER ACTIVITIES, GREAT GIFT IDEAS, etc.), and combination categories (e.g. WEDDING OUTFIT COMBOS, BEDROOM FURNITURE COMBOS, etc.).

Character Fit: a description of how well a resource fits a character with respect to a category.

Consumer: a person or organization that consumes resources.

Object: A data container for information representing specific things that have a number of definable properties. For example, an object can represent an entity such as a person, a location, an organization, a resource, a link, or other noun. An object can represent an event that happens at a point in time or for a duration. An object can represent a document or other unstructured data source such as an e-mail message, a video, or a news article. Each object may be associated with a unique identifier that uniquely identifies the object. The object's attributes (e.g. metadata about the object) may be represented in one or more properties. An "instance" of an object is itself an object.

Object Type: A type of object (e.g. Character, Character Fit, or Category). Object types may be defined by an ontology and may be modified or updated to include additional object types. An object definition (e.g., in an ontology) may include how the object is related to other objects and the properties the object type may have.

Provider: a person or organization that offers or provides resources to consumers Resource: anything that can be consumed or used by consumers, including physical objects, services, and data. A combination of resources can also be a resource.

Resource Data Processing System

FIG. 1 shows an example block diagram 100 showing the transmission of a resource data processing task to a resource data processing system. A resource data processing task can be defined by identifying one or more categories and one or more characters. FIG. 1 shows a computer system 160 being used by a user 180 to transmit data processing task information 170 across a network 150. The resource data processing system 110 receives the data processing task information 170 and provides it to resource data processing service 120. Resource data processing service 120 uses the data processing task information 170 to query a database 130 of objects 140.

In some embodiments, a body of data is conceptually structured according to an object-centric data model represented by an ontology. The conceptual model is independent of any particular database used for durably storing one or more bodies of data based on the ontology. For example, each object of the conceptual data model may correspond to one or more rows in a relational database, an entry in Lightweight Directory Access Protocol (LDAP) database, or a document or key/value pair in a non-relational database.

Object Models

Figure 2:
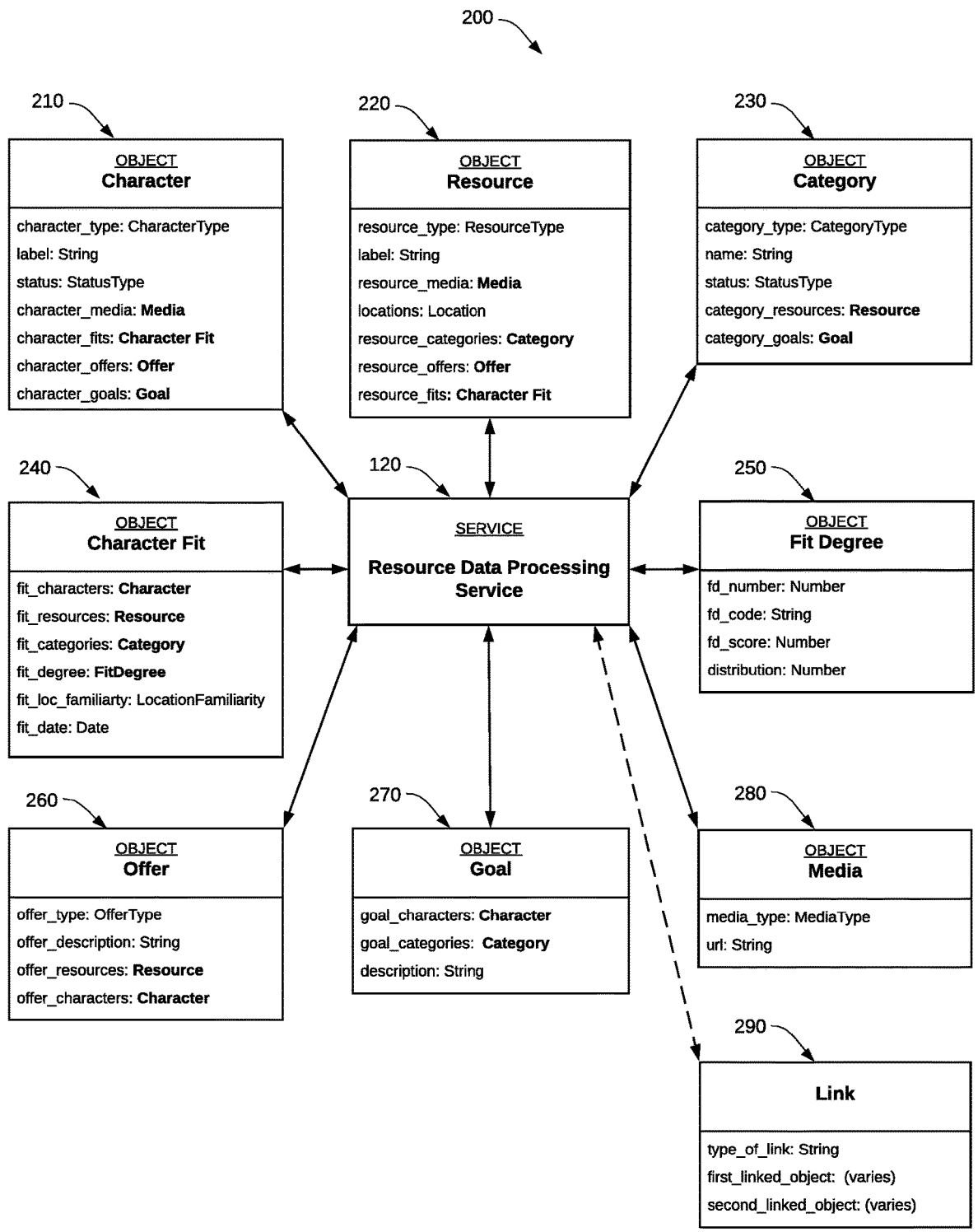
FIG. 2 shows an example block diagram including object models for processing resource data using character fit objects

FIG. 2 shows an example block diagram 200 including object models for processing resource data using characters and character fits. The block diagram includes a character object model 210, a resource object model 220, a category object model 230, a character fit object model 240, a fit degree object model 250, an offer object model 260, a goal object model 270, a media object model 280, a link object model 290, and one or more services 120 for processing resource data. The objects can be stored in a database, such as a relational, LDAP, or non-relational database, and the services 120 can be executed by a computer system such as the resource data processing system 110 described with respect to FIG. 1.

Character Object

In FIG. 2, the character object 210 can represent a character used for processing resource data. The properties of the character object 210 can include character type information such as "character type." The character type information can indicate whether the character represents a viewpoint, budget, or affiliation. The character type information can indicate linked character type objects, or the character type information can be in some other format, such as a string or number. The character object 210 can have a property such as "label" for describing the character represented by the character object. Examples of labels include "MODERN MOM," "INTELLECTUAL," "VALUE SEEKER," etc.

The character object 210 can also have a property such as "status" for describing the status of the character object. Examples of statuses include "active," "inactive," "pending," etc.

The character object 210 can also include a property such as "character_media" to indicate linked media objects 280 that are associated with the character. For example, the linked media objects can represent images associated with the character, such as portraits or icons.

The character object 210 can also include a property such as "character_fits" to indicate linked character fit objects 240 that are associated with the character. For example, the "character_fits" property can indicate character fit objects 240 that represent character_fits that are based on the character represented by the character object 210.

The character object 210 can also have a property such as "character_offers" to indicate one or more linked offer objects 260 that represent offers for which the character is eligible. The character object 210 can also have a property such as "character_goals" to indicate linked goal objects 270 that are associated with the character.

Resource Object

The resource object 220 represents a resource such as a physical object, physical location, service, or data item, or a combination of these. The properties of the resource object 220 can include resource type information such as "resource type." The resource type information can indicate linked resource type objects, or the resource type information can be in some other format, such as a string or number. The resource type information can indicate whether the resource is a single resource or a combination of resources. The resource object 220 can have a property such as "label" for describing the resource represented by the resource object. Examples of labels include "JOHN DEERE LAWN-MOWER MODEL Z525E," "HOME SLICE PIZZA," "THE GODFATHER PART II," etc. The resource object 220 can also include a property such as "resource_media" to indicate linked media objects 280 that are associated with the resource. For example, the linked media objects can represent images or videos associated with the resource, such as photos of physical items or product packaging, videos of services being performed, movie posters, album art, etc.

The properties of the resource object 220 can include location information such as "locations." The location information can indicate locations with which the resource is associated. The location information can indicate linked location objects, or the location information can be in some other format, such as a string corresponding to a street address.

The resource object 220 can also include a property such as "resource_categories" to indicate linked category objects 230 that are associated with the resource. For example, the "resource_categories" property of a resource that is a pizza restaurant can indicate categories RESTAURANTS, ITALIAN RESTAURANTS, and PIZZA.

The resource object 220 can also include a property such as "resource_offers" to indicate linked offer objects 260 that are associated with the resource. Examples of offers include discounts on the resource, resource bundles that include the resource, and two-for-one offers including the resource.

The resource object 220 can also include a property such as "resource_fits" to indicate linked character fit objects 240 that are associated with the resource.

Category Object

A category groups resources together; categories can include class categories (e.g. MEXICAN RESTAURANTS and ELECTRIC RAZORS), list categories (e.g. FUN SUMMER ACTIVITIES and GREAT GIFT IDEAS), and combination categories (e.g. WEDDING OUTFIT COMBOS and BEDROOM FURNITURE COMBOS).

The category object 230 represents a category. The properties of the category object 230 can include category type information such as "category_type." The category type information can indicate whether the category is a class category, list category, or combination category.

The category object 230 can have a property such as "name" for describing the category represented by the category object. Examples of names include "LAWNMOWERS," "MEXICAN RESTAURANTS," "CLEANING SERVICES," "E-BOOKS," etc.

The category object 230 can also have a property such as "status" for describing the status of the category object. Examples of statuses include "active," "inactive," "pending," etc.

The category object 230 can also include a property such as "category_resources" to indicate linked resource objects 220 that are associated with the category. For example, if the category is MEXICAN RESTAURANTS, linked resource objects could include resource objects corresponding to TORCHY'S TACOS and TACO BELL.

The category object 230 can also include a property such as "category_goals" to indicate linked goal objects 270 that are associated with the category.

In some embodiments, categories can be linked to other categories. For example, a parent category RESTAURANTS can be linked to children categories MEXICAN RESTAURANTS and ITALIAN RESTAURANTS.

Figure 14:
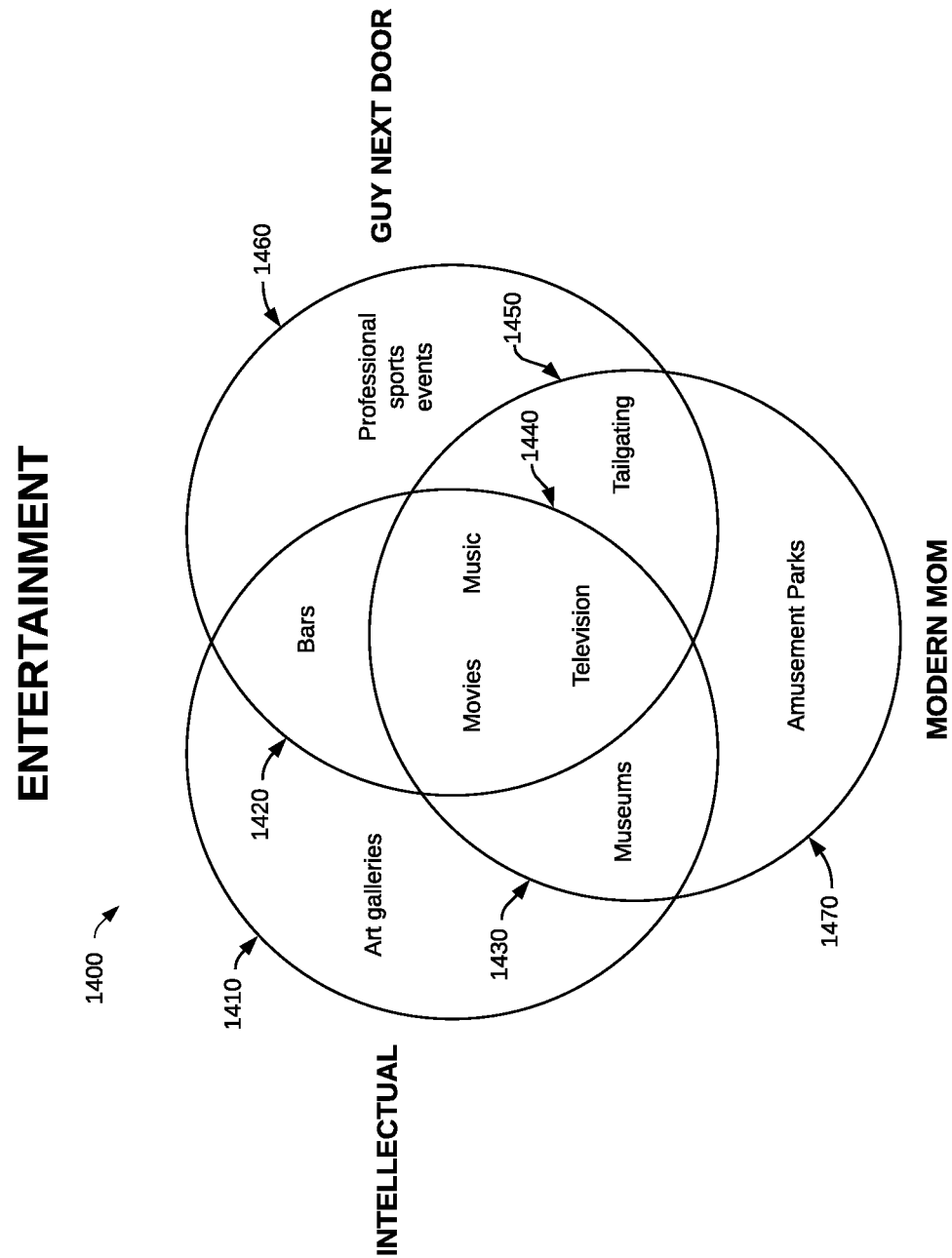
FIG. 14 shows a block diagram illustrating an example character-ready category

In some embodiments, category objects can represent character-ready categories that contemplate the concurrent use of character objects. FIG. 14 illustrates an exemplary character-ready category.

Fit Degree Object

Figure 7:
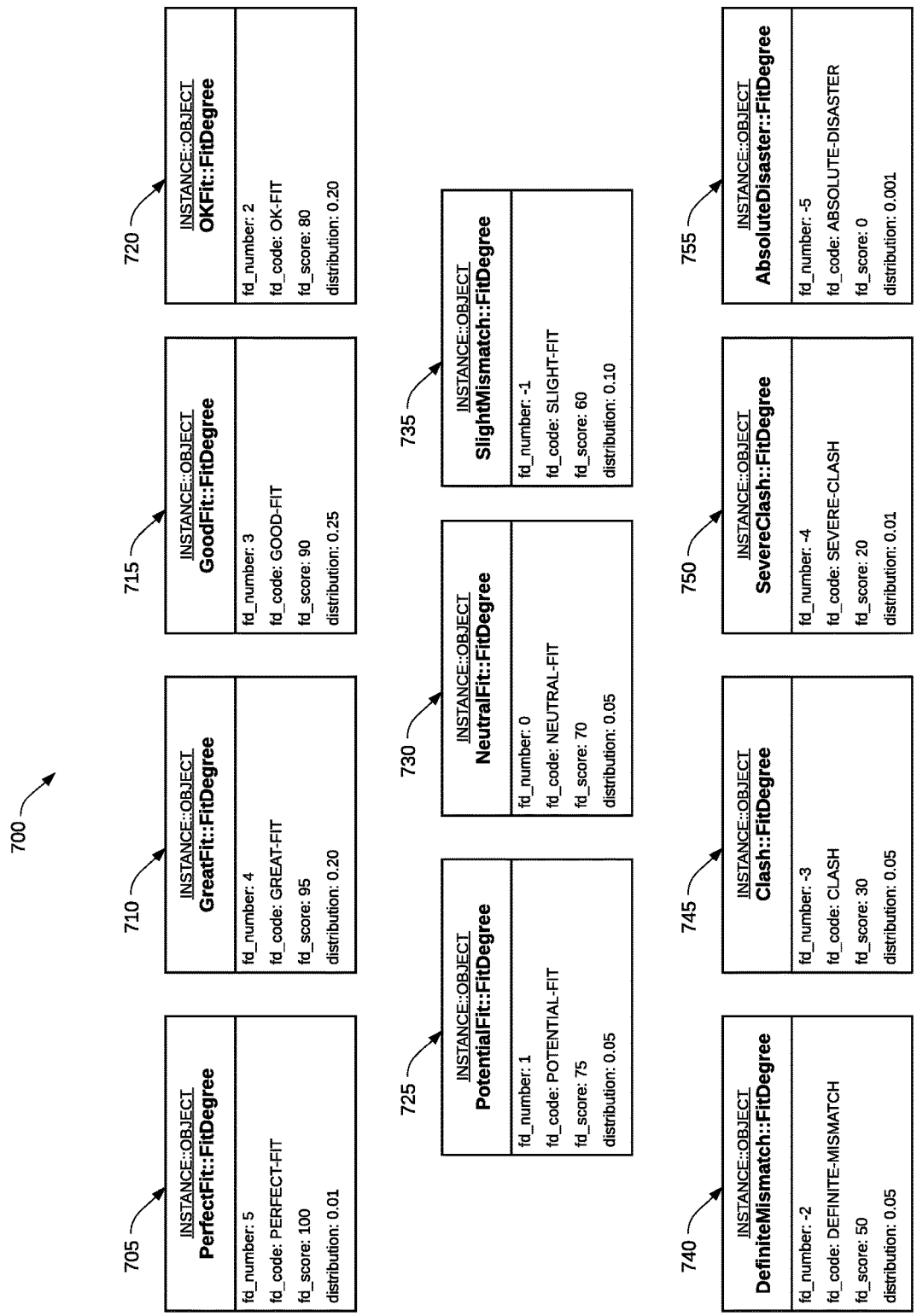
FIG. 7 shows example instances of a fit degree object

The fit degree object 250 represents a degree of fit describing how well a resource fits a character with respect to a category. The properties of the fit degree object 250 can include one or more ways to describe the degree of fit. The fit degree object can include a property such as "fd_number" to indicate a number describing the degree of fit. For example, a "PERFECT FIT" degree of fit could be indicated by the number 5, a "GREAT FIT" degree of fit could be indicated by the number 4, a "SEVERE CLASH" degree of fit could indicated by the number −3, etc. The fit degree object can also include a property such as "fd_code" to indicate a code describing the degree of fit. For example, a "PERFECT FIT" degree of fit could be indicated by the code "PERFECT-FIT", a "GREAT FIT" degree of fit could be indicated by the code "GREAT-FIT", a "SEVERE CLASH" degree of fit could indicated by the code "SEVERE-CLASH", etc. The fit degree object can also include a property such as "fd_score" to indicate a score out of 100 describing the degree of fit. For example, a PERFECT FIT degree of fit could be indicated by a score of 100, a GREAT FIT degree of fit could be indicated by a score of 95, an OK FIT degree of fit could be indicated by a score of 80, etc. FIG. 7 shows example instances of a fit degree object.

The fit degree object can include a property such as "distribution" to indicate how the degree of fit should be distributed with respect to resources in a category on average. For example, the distribution of a PERFECT FIT degree of fit can be indicated by the number 0.01 (i.e. 1% of resources within a category should receive a PERFECT FIT degree of fit), the distribution of a GREAT FIT degree of fit can be indicated by the number 0.05 (i.e. 5% of resources within a category should receive a GREAT FIT degree of fit), the distribution of a GOOD FIT degree of fit can be indicated by the number 0.20 (i.e. 20% of resources within a category should receive a GOOD FIT degree of fit), etc. Of course, distribution numbers can differ from the examples provided (e.g. the PERFECT FIT distribution can be 0.05 or some other number instead of 0.01) or may not be included at all.

Character Fit Object

A character fit is a description of how well a resource fits a character with respect to a category. The character fit object 240 can represent a character fit used for processing resource data. The character fit object 240 can include a property such as "fit_characters" to indicate linked character objects 210 that represent characters on which the character fit is based. The character fit object 240 can also include a property such as "fit_resources" to indicate linked resource objects 220 that represent resources on which the character fit is based. The character fit object 240 can also include a property such as "fit_categories" to indicate linked category objects 230 that represent categories on which the character fit is based.

The properties of the character fit object 240 can include fit degree information such as "fit_degree." The fit degree information can indicate the degree of fit corresponding to the combination of objects identified by the fit_characters, fit_resources, and fit_categories properties. The fit degree information can indicate linked fit degree objects 250, or the fit degree information can be in some other format, such as a string or number. For example, fit degrees can be expressed as numbers (e.g. integers, decimal numbers, etc.), codes, and phrases.

In some embodiments, the character fit object 240 can include a property such as "fit_loc_familiarity" to indicate the degree of familiarity the characters identified by the fit_characters property have with respect to the location of resources identified by the fit_resources property. The location familiarity information can indicate linked location familiarity objects, or the location familiarity information can be in some other format, such as a string or number. For example, the location familiarity information can indicate whether the character is a TOURIST or a NATIVE.

Examples of character fits include the following:

HOME SLICE PIZZA (fit_resources) is a GOOD FIT (fit_degree) for MODERN MOM (fit_characters) for RESTAURANTS (fit_categories) when she is a NATIVE (fit_loc_familiarity);

TEXAS STATE CAPITOL and BULLOCK MUSEUM (fit_resources) are a GREAT FIT (fit_degree) for MODERN MOM and INTELLECTUAL (fit_characters) for TOURIST ATTRACTIONS (fit_categories) when they are TOURISTS (fit_loc_familiarity).

The character fit object 240 can also have a property such as "fit date" to indicate date information related to the character fit, such as the date on which the fit degree was determined or the date the character fit expires.

Character fits can be determined using various techniques. As one example, fit appraisers can create character fits by assigning a fit degree to a combination of a character, resource, and category (e.g. after visiting Home Slice Pizza, trying a slice of pizza, and speaking with other customers, fit appraiser Jennifer can create a fit appraisal indicating that HOME SLICE PIZZA is a GREAT FIT for RESTAURANTS for MODERN MOM). As another example, character fits can be created by groups of users who are assigned or mapped to characters. In this example, users Andy, Bob, and Charlie are assigned to the character GUY NEXT DOOR and each user determines an individual fit degree for HOME SLICE PIZZA (either for himself or on behalf of GUY NEXT DOOR). Andy determines that the restaurant is a GOOD FIT, Bob determines that it is a GREAT FIT, and Charlie determines that it is a GOOD FIT. The resulting character fit based on the three combined individual fit degrees reflects that HOME SLICE PIZZA is a GOOD FIT for RESTAURANTS for GUY NEXT DOOR. As another example, character fits can be determined using artificial intelligence (e.g. by analyzing publicly-available data from social media platforms and mapping influencers to characters).

Offer Object

The offer object 260 represents an offer relating to a resource. The properties of the offer object 260 can include offer type information such as "offer type." The offer type information can indicate linked offer type objects, or the offer type information can be in some other format, such as a string or number. Examples of offer types include regular retail sale, discount, coupon, rebate, "buy one, get one free," product bundles, free samples, etc.

The offer object 260 can have a property such as "offer description" for describing the offer represented by the offer object. Examples of offer descriptions include "25% off Single Pizza Slice," "Buy one slice, get one free," "Coupon for free pizza slice," etc. The offer object 260 can also include a property such as "offer_resources" to indicate linked resource objects 220 that are associated with the offer. The offer object 260 can also include a property such as "offer_characters" to indicate linked character objects 210 that are associated with the offer.

Goal Object

The goal object 270 represents a goal that a character has with respect to a category. The goal object 270 can include a property such as "goal_characters" to indicate linked character objects 210 that are associated with the goal. The goal object 270 can also include a property such as "goal_categories" to indicate linked category objects 230 that are associated with the goal. The goal object 270 can have a property such as "description" for describing the goal represented by the goal object.

Examples of goals include the following:

A goal of MODERN MOM (goal_characters) for RESTAURANTS (goal_categories) is "kid-friendly food options" (goal_description);

A goal of TRENDSETTER (goal_characters) for RESTAURANTS (goal_categories) is "trendy, fashionable ambience" (goal_description);

A goal of GUY NEXT DOOR (goal_characters) for RESTAURANTS (goal_categories) is "standard food options, casual, not too fancy" (goal_description).

In some embodiments, after a user selects a category, goal descriptions can be displayed in association with characters (e.g. if a user selects RESTAURANTS as the category, the phrase "kid-friendly food options" is displayed next to MODERN MOM and the phrase "trendy, fashionable ambience" is displayed next to TRENDSETTER to help the user decide which character to select as part of the user's resource data processing task).

Media Object

The media object 280 represents a media item. Examples of media items include images, such as icons and photos, audio files, or videos. The properties of the media object 280 can include media type information such as "media type." The media type information can indicate linked media type objects, or the media type information can be in some other format, such as a string or number. The media type information can indicate whether the media item is an image, video, audio file, etc. The media object 280 can also have a property such as "url" for describing the URL associated with the media item.

In various embodiments, the links between objects can be achieved in different ways. As one example. FIG. 2 shows a symmetrical link between category objects 230 and resource objects 220 in that each category object 230 can indicate linked resource objects 220 (e.g., via the category_resources property of the category object 230), and in that each resource object 220 can indicate linked category objects 230 (e.g. via the resource_categories property of the resource object 220). As another example, FIG. 2 shows a unidirectional link between character fit object 240 and category object 230. The character fit object 240 may be linked to a category object 230 (e.g., via the "fit_categories" property of the character fit object 240), but the category object 230 does not include a property indicating which character_fits are linked to the category. Symmetrical links provide redundant information but may sometimes facilitate searching. In various embodiments, any combination of the links shown in FIG. 2 could be implemented as asymmetrical or symmetrical links.

In some embodiments, the links implemented through properties of objects can be additionally or alternatively implemented using a link 290. The link 290 can include a description about the type of link (e.g., the "type_of_link") being represented or established by the link 290. The link 290 can include a first linked object and a second linked object that are linked to each other. The first and second linked objects can include character objects 210, resource objects 220, category objects 230, character fit objects 240, fit degree objects 250, offer objects 260, goal objects 270, and/or media objects 280. For example, a link 290 can have a type of link that represents "category associated with a resource," the first linked object can be one linked to a category object 230, and the second linked object can be one linked to a resource object 220.

Other example types of links can indicate that:

A resource object 220 "has a category of" a category object 230;

An offer object 260 "offers" a resource object 220;

An offer object 260 "is offered to" a character object 210;

A goal object 270 "identifies a goal for" a character object 210;

A goal object 270 "identifies a goal with respect to" a category object 230;

Any other linked property or relationship discussed herein, including symmetric or asymmetric versions thereof.

Accordingly, in various embodiments, one, some, or all objects discussed herein can be linked by a link 290 instead of (or in addition to) having properties that specify linked objects. In various embodiments, one, some, or all objects discussed herein can be linked by a link 290 instead of (or in addition to) being linked through matching properties. In some embodiments, the link 290 can include additional (e.g., third, fourth, . . . , Nth) linked objects and indicate more complex multi-object relationships.

Figure 3:
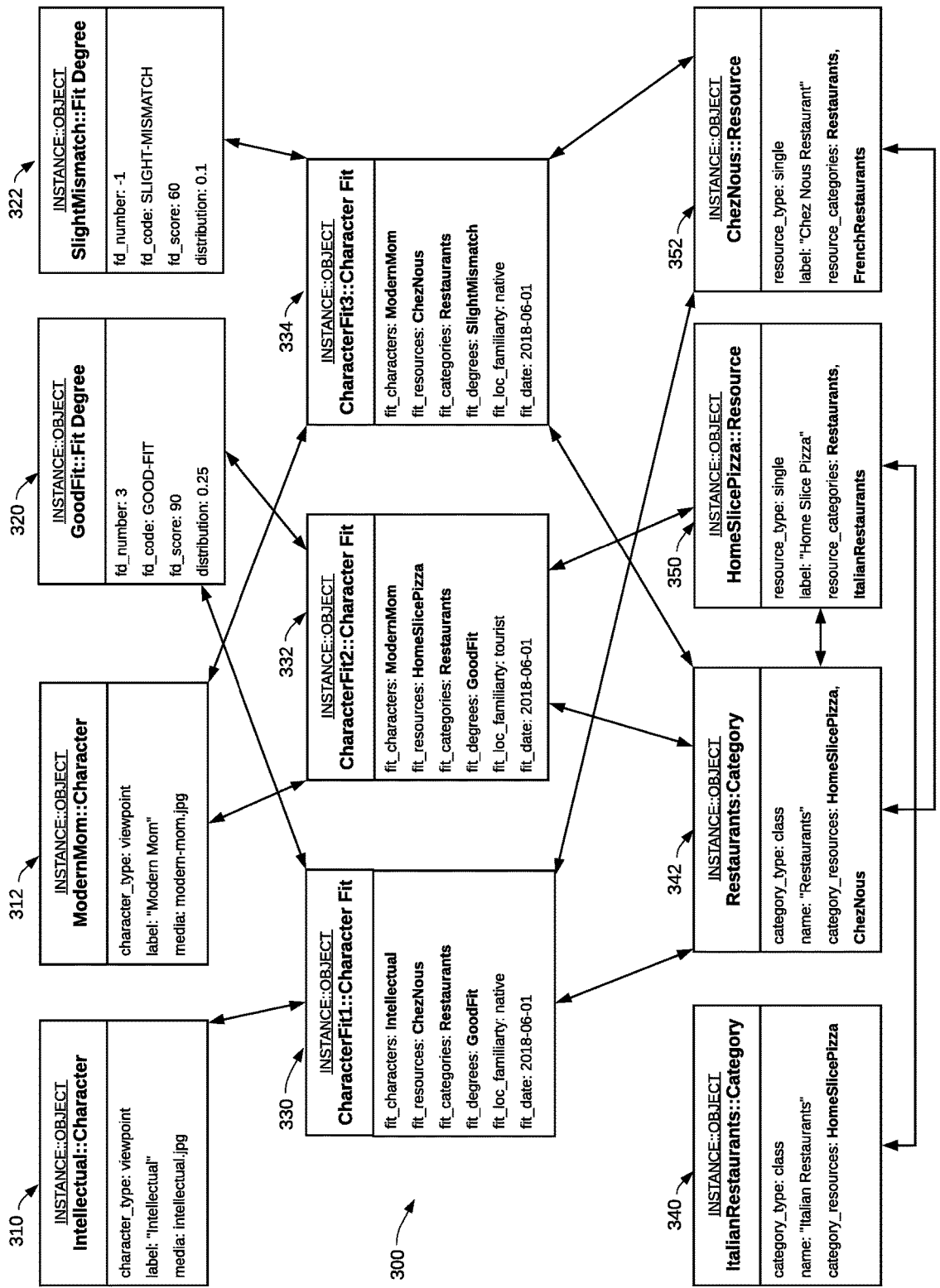
FIG. 3 shows example models for instances of objects related to character fit object instances

FIG. 3 shows example models for instances of objects related to character fit object instances 330, 332, and 334, named "CharacterFit1," "CharacterFit2," and "CharacterFit3," respectively. FIG. 3 also includes an instance "Intellectual" 310 of a character object, an instance "ModernMom" 312 of a character object, an instance "GoodFit" 320 of a fit degree object, an instance "SlightMismatch" 322 of a fit degree object, an instance "ItalianRestaurants" 340 of a category object, an instance "Restaurants" 342 of a category object, an instance "HomeSlicePizza" 350 of a resource object, and an instance "ChezNous" 352 of a resource object. An instance Name of an object may be discussed herein by reference to Name.

Arrows are used in FIG. 3 to indicate links. In various embodiments, the links can be implemented as asymmetrical links or as symmetrical links. In various embodiments, the links can be implemented with links 290 discussed with respect to FIG. 2. Links can be implemented through matching properties of objects.

The "Intellectual" character 310 represents a viewpoint character who has a label of "Intellectual" and is represented by media object "intellectual.jpg". The "ModernMom" character 312 represents a viewpoint character who has a label of "Modern Mom" and is represented by media object "modern-mom.jpg".

The "GoodFit" fit degree 320 represents a fit degree with a fit number of 3, a fit code of GOOD-FIT, a fit score of 90, and a distribution of 0.25. The "SlightMismatch" fit degree 322 represents a fit degree with a fit number of −1, a fit code of SLIGHT-MISMATCH, a fit score of 60, and a distribution of 0.1.

The "ItalianRestaurants" category 340 represents a class category named "Italian Restaurants." The "Restaurants" category 342 represents a class category named "Restaurants."

The "HomeSlicePizza" resource 350 represents a resource with a label of "Home Slice Pizza." The resource_categories property of HomeSlicePizza 350 indicates that HomeSlicePizza 350 is associated with categories Restaurants 342 and ItalianRestaurants 340. The link between HomeSlicePizza 350 and category Restaurant 342 is represented as an arrow between HomeSlicePizza 350 and Restaurants 342, and the link between HomeSlicePizza 350 and category ItalianRestaurants 340 is represented as an arrow between HomeSlicePizza 350 and Restaurants 340. The "ChezNous" resource 352 represents a resource with a label of "Chez Nous Restaurant." The resource_categories property of ChezNous 352 indicates that ChezNous 352 is associated with categories Restaurants 342 and FrenchRestaurants (not shown).

The category_resources property of ItalianRestaurants 340 indicates that ItalianRestaurants 340 is associated with resource HomeSlicePizza 350. The link between ItalianRestaurants 340 and HomeSlicePizza 350 is represented as an arrow between ItalianRestaurants 340 and HomeSlicePizza 350. The category_resources property of Restaurants 342 indicates that Restaurants 342 is associated with resources HomeSlicePizza 350 and ChezNous 352.

CharacterFit1 330 defines a fit between character Intellectual 310, resource ChezNous 352, category Restaurants 342, and fit degree GoodFit 320. Specifically, CharacterFit1 330 indicates that ChezNous (ChezNous 352) is a good fit (GoodFit 320) for an intellectual (Intellectual 310) for restaurants (Restaurants 342) when the intellectual is a native with respect to the location where ChezNous is located.

The fit_characters property of CharacterFit1 330 indicates that CharacterFit1 330 is associated with character Intellectual 310. The link between CharacterFit1 330 and character Intellectual 310 is represented as an arrow between CharacterFit1 330 and Intellectual 310.

The fit_resources property of CharacterFit1 330 indicates that CharacterFit1 330 is associated with resource ChezNous 352. The link between CharacterFit1 330 and resource ChezNous 352 is represented as an arrow between CharacterFit1 330 and ChezNous 352.

The fit_categories property of CharacterFit1 330 indicates that CharacterFit1 330 is associated with category Restaurants 342. The link between CharacterFit1 330 and category Restaurants 342 is represented as an arrow between CharacterFit1 330 and Restaurants 342.

The fit_degree property of CharacterFit1 330 indicates that CharacterFit1 330 is associated with fit degree GoodFit 320. The link between CharacterFit1 330 and fit degree GoodFit 320 is represented as an arrow between CharacterFit1 330 and GoodFit 320.

The fit_loc_familiarity property of CharacterFit1 330 indicates that CharacterFit1 330 is associated with a character who is a native with respect to the location associated with ChezNous 352. The fit_date property of CharacterFit1 330 indicates that CharacterFit1 330 was determined on Jun. 1, 2018. In some embodiments, the fit_date property indicates the date CharacterFit1 expires or the date CharacterFit1 becomes valid.

CharacterFit2 332 defines a fit between character ModernMom 312, resource HomeSlicePizza 350, category Restaurants 342, and fit degree GoodFit 320. Specifically, CharacterFit2 332 indicates that HomeSlicePizza (HomeSlicePizza 350) is a good fit (GoodFit 320) for an a mom with a modern sensibility (ModernMom 312) for restaurants (Restaurants 342) when the mom is a tourist with respect to the location where HomeSlicePizza is located.

CharacterFit3 334 defines a fit between character ModernMom 312, resource ChezNous 352, category Restaurants 342, and fit degree SlightMismatch 322. Specifically, CharacterFit3 334 indicates that ChezNous (ChezNous 352) is a slight mismatch (SlightMismatch 322) for an a mom with a modern sensibility (ModernMom 312) for restaurants (Restaurants 342) when the mom is a native with respect to the location where ChezNous is located.

Viewpoint Characters

Figure 4:
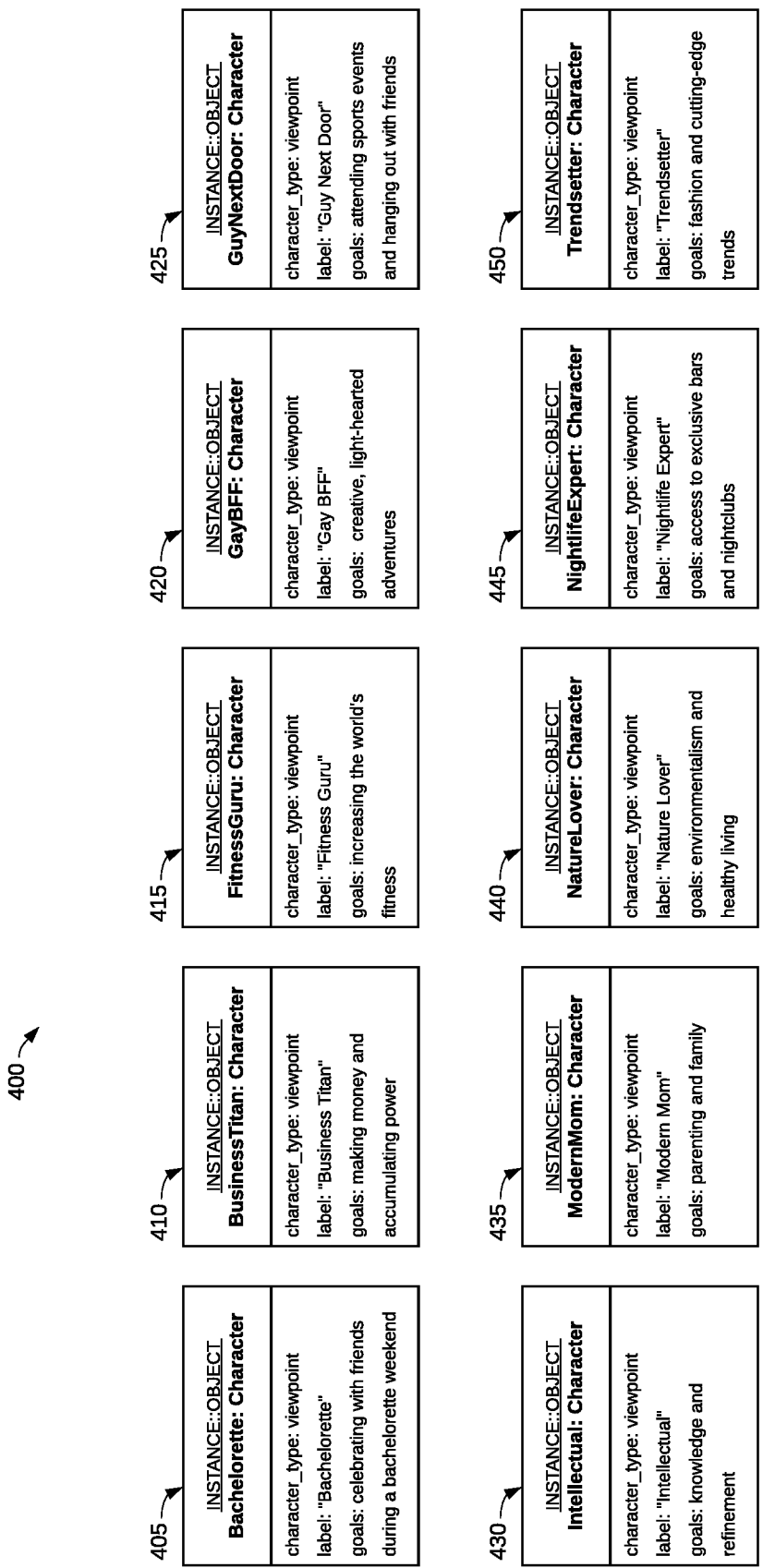
FIG. 4 shows example instances of a character object with each instance representing a viewpoint character

FIG. 4 shows example instances of a character object with each instance representing a viewpoint character. Instances include "Bachelorette" 405, "BusinessTitan" 410, "FitnessGuru" 415, "GayBFF" 420, "GuyNextDoor" 425, "Intellectual" 430, "ModernMom" 435, "NatureLover" 440, "NightlifeExpert" 445, and "Trendsetter" 450.

The "Bachelorette" character 405 represents a viewpoint character with a label of "Bachelorette" and goals of "celebrating with friends during a bachelorette weekend."

The "BusinessTitan" character 410 represents a viewpoint character with a label of "Business Titan" and goals of "making money and accumulating power."

The "FitnessGuru" character 415 represents a viewpoint character with a label of "Fitness Guru" and goals of "increasing the world's fitness."

The "GayBFF" character 420 represents a viewpoint character with a label of "GayBFF" and goals of "creative, light-hearted adventures."

The "GuyNextDoor" character 425 represents a viewpoint character with a label of "Guy Next Door" and goals of "attending sports events and hanging out with friends."

The "Intellectual" character 430 represents a viewpoint character with a label of "Intellectual" and goals of "knowledge and refinement."

The "ModernMom" character 435 represents a viewpoint character with a label of "Modern Mom" and goals of "parenting and family."

The "NatureLover" character 440 represents a viewpoint character with a label of "Nature Lover" and goals of "environmentalism and healthy loving."

The "NightlifeExpert" character 445 represents a viewpoint character with a label of "Nightlife Expert" and goals of "access to exclusive bars and nightclubs."

The "Trendsetter" character 450 represents a viewpoint character with a label of "Trendsetter" and goals of "fashion and cutting-edge trends."

The viewpoint character object instances shown in FIG. 4 are for example purposes only. Additional, fewer, and different viewpoints can be implemented.

Budget Characters

A budget character reflects a budget. A budget can be expressed in terms of time, money, value (bang for the buck), and effort.

Figure 5:
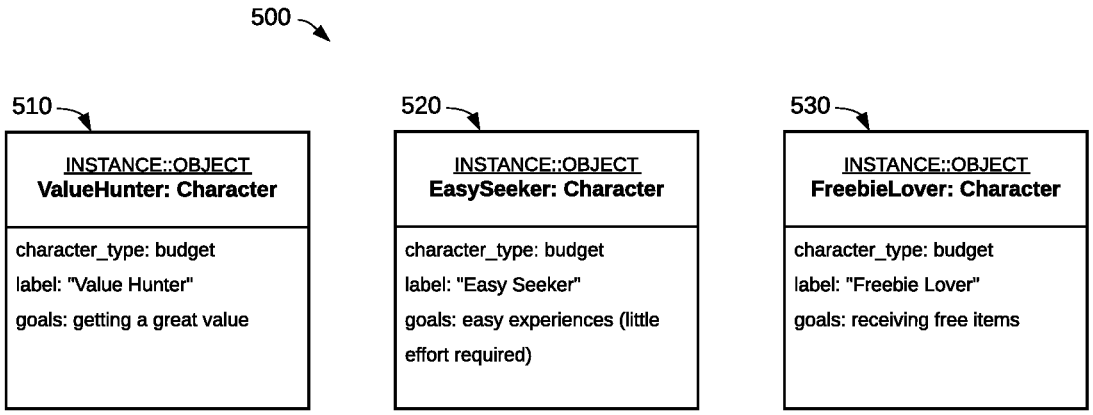
FIG. 5 shows example instances of a character object with each instance representing a budget character

FIG. 5 shows example models for instances of a character object with each instance representing a budget character. Instances include "ValueHunter" 510, "EasySeeker" 520, and "FreebieLover" 530. The "ValueHunter" character 510 represents a budget character with a label of "Value Hunter" and goals of "getting a great value." The "EasySeeker" character 520 represents a budget character with a label of "Easy Seeker" and goals of "easy experiences (little effort required)." The "FreebieLover" character 530 represents a budget character with a label of "Freebie Lover" and goals of "receiving free items."

The budget character object instances shown in FIG. 5 are for example purposes only. Additional, fewer, and different budgets can be implemented.

Affiliation Characters

An affiliation character reflects an affiliation with a location (e.g. home address, neighborhood, current GPS location, etc.), organization (employer, club, store, etc.), person (friend, spouse, child, etc.), or event (e.g. TV show, concert, cruise, etc.).

Figure 6:
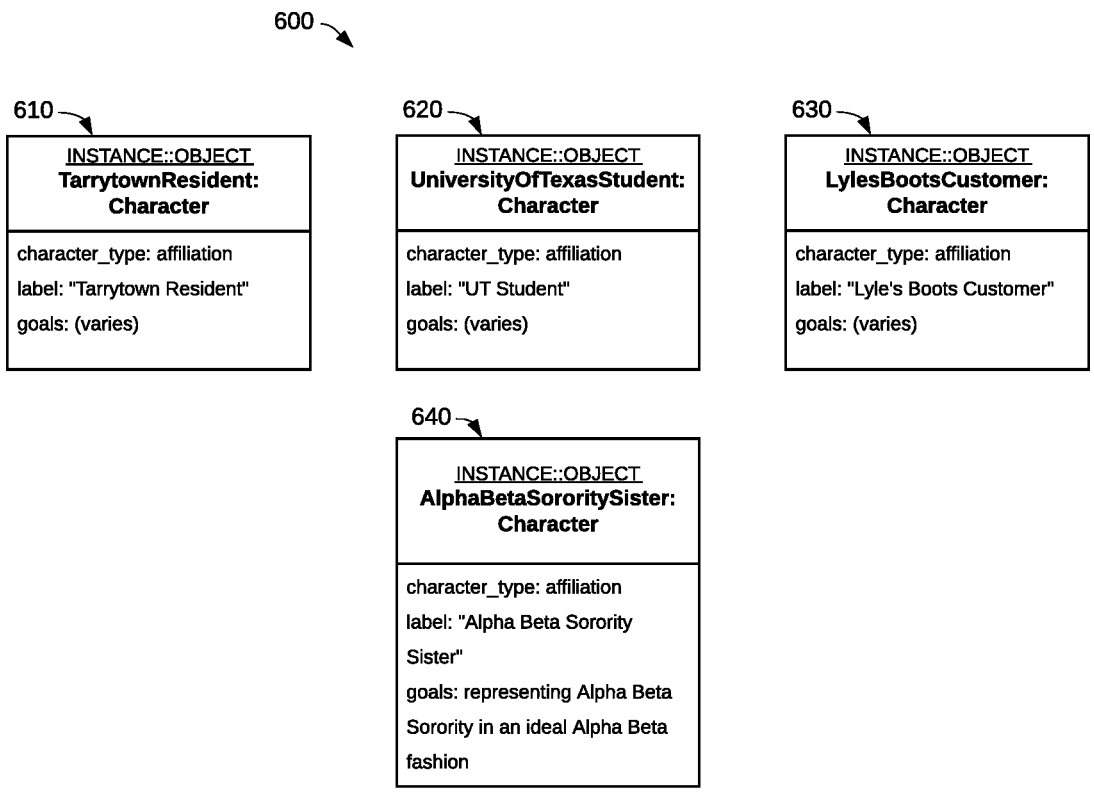
FIG. 6 shows example instances of a character object with each instance representing an affiliation character

FIG. 6 shows example instances of a character object with each instance representing an affiliation character. Instances include "TarrytownResident" 610, "UniversityOfTexasStudent" 620, "LylesBootsCustomer" 630, and "AlphaBetaSororitySister" 640.

The "TarrytownResident" character 610 represents an affiliation character with a label of "Tarrytown Resident" who lives in the Tarrytown neighborhood of Austin, Tex.

The "UniversityOfTexasStudent" character 620 represents an affiliation character with a label of "UT Student" who attends the University of Texas at Austin.

The "LylesBootsCustomer" character 630 represents an affiliation character with a label of "Lyles Boots Customer" who is a customer of Lyles Boots in Austin, Tex.

The "AlphaBetaSororitySister" character 640 represents an affiliation character with a label of "Alpha Beta Sorority Sister" who is a member of the Alpha Beta Sorority and who has goals of "representing Alpha Beta Sorority in an ideal Alpha Beta fashion." In some embodiments, AlphaBetaSororitySister 640 can be both a viewpoint and affiliation character who represents a viewpoint associated with Alpha Beta Sorority as well as an affiliation with Alpha Beta Sorority.

The affiliation character object instances shown in FIG. 6 are for example purposes only. Additional, fewer, and different types of affiliations can be implemented.

Fit Degrees

FIG. 7 shows example instances of a fit degree object, including instances "PerfectFit" 705, "GreatFit" 710, "GoodFit" 715, "OKFit" 720, "PotentialFit" 725, "NeutralFit" 730, "SlightMismatch" 735, "DefiniteMismatch" 740, "Clash" 745, "SevereClash" 750, and "AbsoluteDisaster" 755.

The "PerfectFit" fit degree 705 represents an fit degree with a fit number of 5, a fit code of PERFECT-FIT, a fit score of 100, and a distribution of 0.01.

The "GreatFit" fit degree 710 represents an fit degree with a fit number of 4, a fit code of GREAT-FIT, a fit score of 95, and a distribution of 0.20.

The "GoodFit" fit degree 715 represents an fit degree with a fit number of 3, a fit code of GOOD-FIT, a fit score of 90, and a distribution of 0.25.

The "OKFit" fit degree 720 represents an fit degree with a fit number of 2, a fit code of OK-FIT, a fit score of 80, and a distribution of 0.20.

The "PotentialFit" fit degree 725 represents an fit degree with a fit number of 1, a fit code of POTENTIAL-FIT, a fit score of 75, and a distribution of 0.05.

The "NeutralFit" fit degree 730 represents an fit degree with a fit number of 0, a fit code of NEUTRAL-FIT, a fit score of 70, and a distribution of 0.05.

The "SlightMismatch" fit degree 735 represents an fit degree with a fit number of −1, a fit code of SLIGHT-FIT, a fit score of 60, and a distribution of 0.10.

The "DefiniteMismatch" fit degree 740 represents an fit degree with a fit number of −2, a fit code of DEFINITE-MISMATCH, a fit score of 50, and a distribution of 0.05.

The "Clash" fit degree 745 represents an fit degree with a fit number of −3, a fit code of CLASH, a fit score of 30, and a distribution of 0.05.

The "SevereClash" fit degree 750 represents an fit degree with a fit number of −4, a fit code of SEVERE-CLASH, a fit score of 20, and a distribution of 0.01.

The "AbsoluteDisaster" fit degree 755 represents an fit degree with a fit number of −5, a fit code of ABSOLUTE-DISASTER, a fit score of 0, and a distribution of 0.001.

Distribution numbers can be approximate and may not add up to 1.

Data Processing Services

Figure 8:
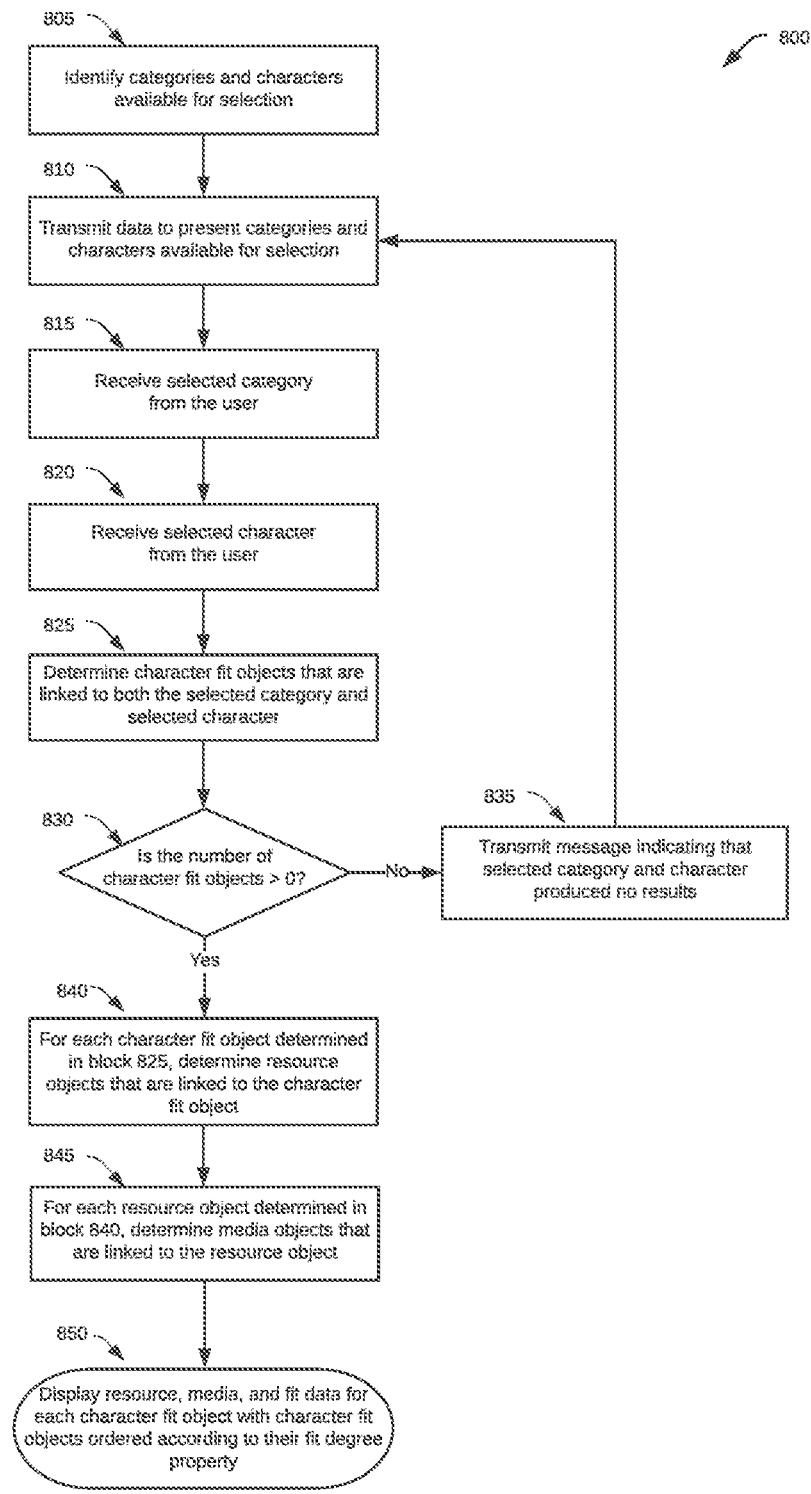
FIG. 8 shows a flowchart for an example resource data processing service

FIG. 8 shows a flowchart 800 for an example resource data processing service.

At block 805, categories and characters available for selection can be identified. As an example, instances of category objects 230 with a status property of "active" can be identified along with instances of character objects 210 with a status property of "active."

At block 810, data can be transmitted to present categories and characters available for a user to select. In some embodiments, the categories can be presented by displaying a category name and/or category icon and the characters can be presented by displaying a character label and/or a character icon.

At block 815, a selected category can be received from the user. At block 820, a selected character can be received from the user. In some embodiments, the order of blocks 815 and 820 may be switched, so that the character is selected before the category.

At block 825, character fit objects 240 that are linked to both the selected category and selected character may be determined. For example, character fit objects 240 with linked fit_categories matching the selected category and linked fit_characters matching the selected character can be identified. As another example, a plurality of links 290 that include links between character fit objects 240 and category objects 230 and links between character fit objects 240 and character objects 210 can be examined to identify which of the character fit objects 240 are linked to both the selected category and selected viewpoint character.

At block 830, it can be determined whether the number of character fit objects determined in block 825 is greater than 0. If the number of character fit objects is not greater than 0, block 830 can proceed to block 835. If the number of character fit objects is greater than 0, block 830 can proceed to block 840.

At block 835, a message indicating that the selected category and selected character produced no results can be transmitted to the user. Block 835 can proceed to block 810.

At block 840, for each character fit object 240 identified in block 825, resource objects that are linked to the character fit object may be determined. For example, linked fit_resources for each character fit object 240 can be identified. As another example, resource objects 220 with linked resource_fits matching each character fit object can be determined. As another example, a plurality of links 290 that include links between character fit objects 240 and resource objects 220 can be examined to identify which of the resource objects 220 are linked to each character fit object identified in block 825.

At block 845, for each resource object 220 identified in block 840, media objects that are linked to the resource object can be determined. For example, linked resource_media for each resource object 220 can be identified.

At block 850, resource, media, and fit data associated with each character fit object determined in block 825 may be displayed and the character fit objects can be ordered according to their fit degree property. For example, resource, media, and fit data for a first character fit object may include a resource name (e.g. "Torchy's Tacos"), a media object (e.g. an image showing the logo for TORCHY'S TACOS), and an associated fit degree (e.g. PERFECT FIT). Resource, media, and fit data for a second character fit object may include a resource name (e.g. "One Taco Restaurant"), a media object (e.g. an image showing the logo for ONE TACO RESTAURANT), and an associated fit degree (e.g. GOOD FIT). In this example, TORCHY'S TACOS is presented before ONE TACO RESTAURANT because a PERFECT FIT precedes a GOOD FIT when fit degrees are sorted in descending order of fit.

Figure 9:
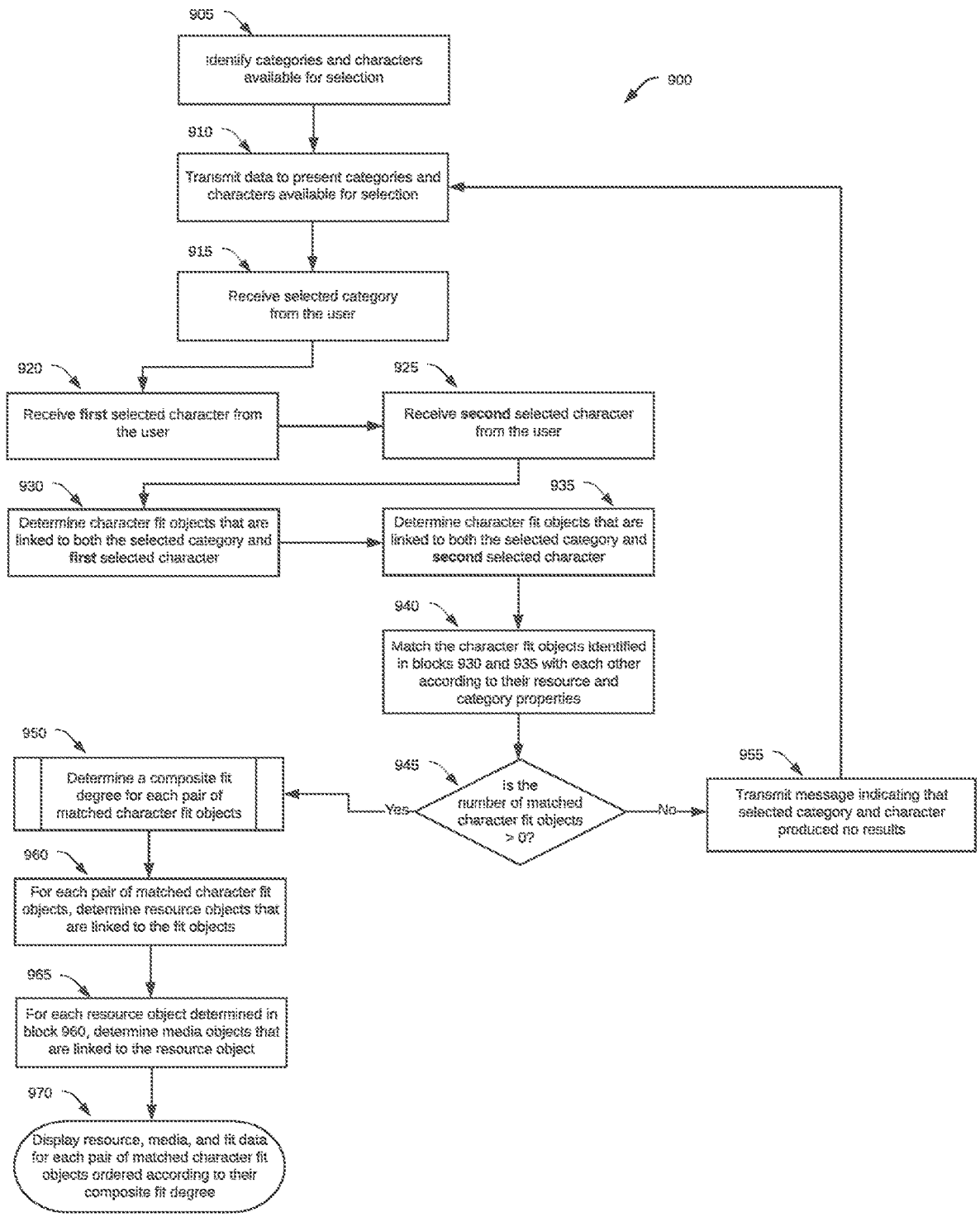
FIG. 9 shows a flowchart for an example resource data processing service involving multiple characters

FIG. 9 shows a flowchart 900 for an example resource data processing service involving multiple characters.

At block 905, categories and characters available for selection can be identified. As an example, instances of category objects 230 with a status property of "active" can be identified along with instances of character objects 210 with a status property of "active."

At block 910, data can be transmitted to present categories and characters available for a user to select. In some embodiments, the categories can be presented by displaying a category name and/or category icon and the characters can be presented by displaying a character label and/or a character icon.

At block 915, a selected category can be received from the user. At block 920, a first selected character can be received from the user. At block 925, a second selected character can be received from the user.

In some embodiments, blocks 920 and 925 may come before block 915, so that the first and second characters are selected before the category.

At block 930, character fit objects 240 that are linked to both the selected category and first selected character may be determined. For example, character fit objects 240 with linked fit_categories matching the selected category and linked fit_characters matching the first selected character can be identified. As another example, a plurality of links 290 that include links between character fit objects 240 and category objects 230 and links between character fit objects 240 and character objects 210 can be examined to identify which of the character fit objects 240 are linked to both the selected category and first selected character.

At block 935, character fit objects 240 that are linked to both the selected category and second selected character may be determined.

At block 940, the character fit objects 240 identified in block 930 can be matched with the character fit objects 240 identified in block 935 according to their resource and category properties to form character fit object pairs (i.e. pairs of character objects that include one character object linked to the first selected character and another character object linked to the second selected character where both character objects have the same resource and category properties). For example, a character fit object identified in block 930 with a fit_characters property corresponding to MODERN MOM (first selected character), a fit_resources property corresponding to TORCHY'S TACOS, and a fit_categories property corresponding to MEXICAN RESTAURANTS may be matched with a character fit object identified in block 935 with a fit_characters property corresponding to TRENDSETTER (second selected character), a fit_resources property corresponding to TORCHY'S TACOS and a fit_categories property corresponding to MEXICAN RESTAURANTS because both character fit objects have the same fit_categories and fit_resources properties.

At block 945, it can be determined whether the number of matched character fit object pairs determined in block 940 is greater than 0. If the number of matched character fit object pairs is not greater than 0 (e.g. there were no matches among the character fit objects based on fit_resources and fit_categories), block 945 can proceed to block 955. If the number of matched character fit objects is greater than 0, block 945 can proceed to block 950.

At block 955, a message indicating that the selected category and selected character produced no results can be transmitted to the user. Block 955 can proceed to block 910.

Figure 13:
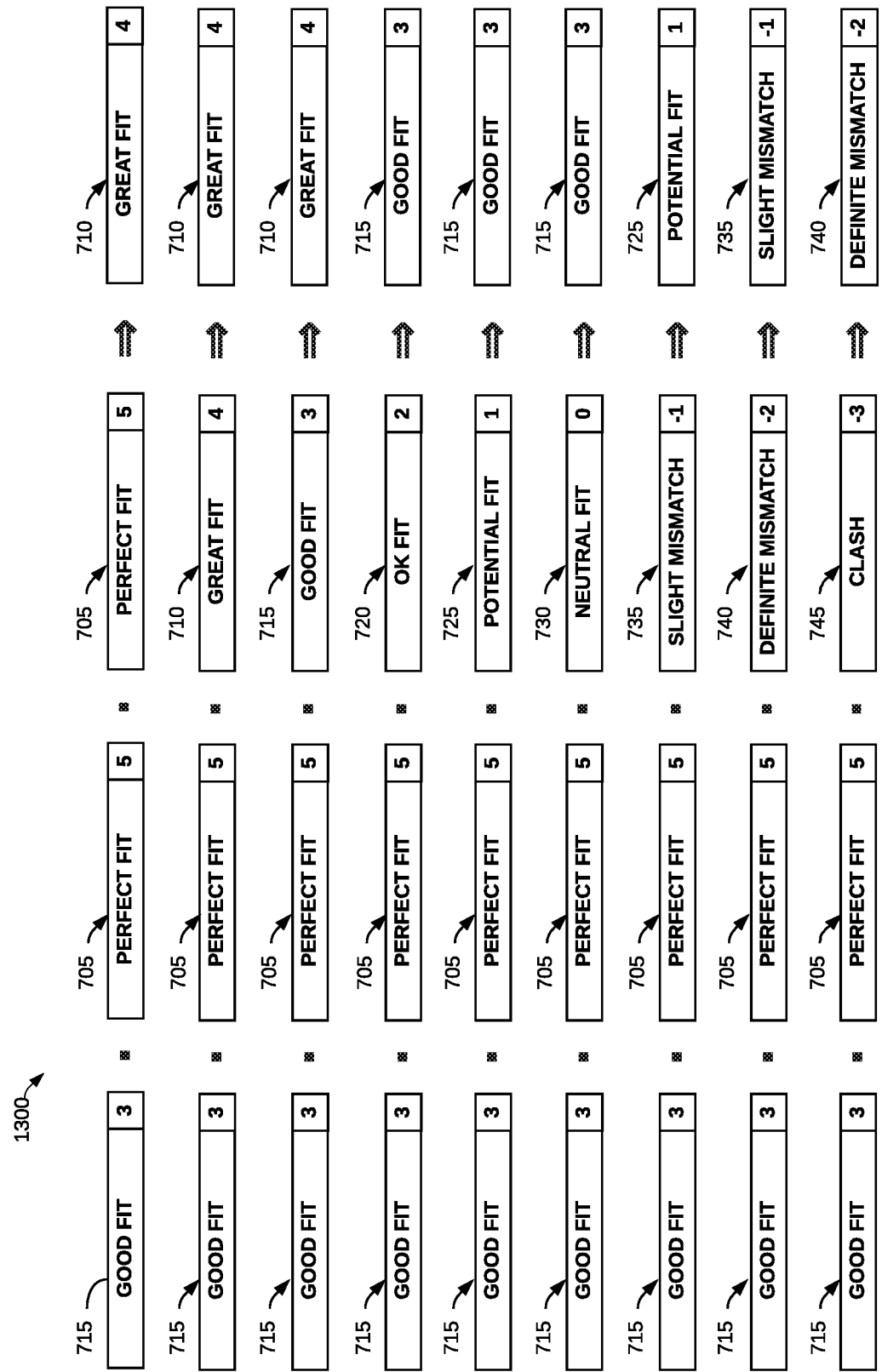
FIG. 13 shows a block diagram illustrating example models for generating composite fit degrees

At block 950, a composite fit degree for each pair of matched character fit objects 240 identified in block 940 can be determined. For example, the two fit degrees in each pair of matched character fit objects 240 can combined by looking up a composite fit degree in a lookup table, by using an algorithm on the fly to convert the two fit degrees into a composite degree, by averaging them together, etc. FIG. 13 shows an example model for combining three fit degrees into a composite fit degree that reflects human dynamics. Block 950 can proceed to 960.

At block 960, for each pair of character fit objects 240 identified in block 940, resource objects that are linked to the character fit objects in each pair of character fit objects 240 may be determined.

At block 965, for each resource object 220 identified in block 960, media objects that are linked to the resource object may be determined.

At block 970, resource, media, and fit data associated with each pair of character fit objects 240 determined in block 940 may be displayed and the character fit objects can be ordered according to their composite fit degree property.

Figure 10:
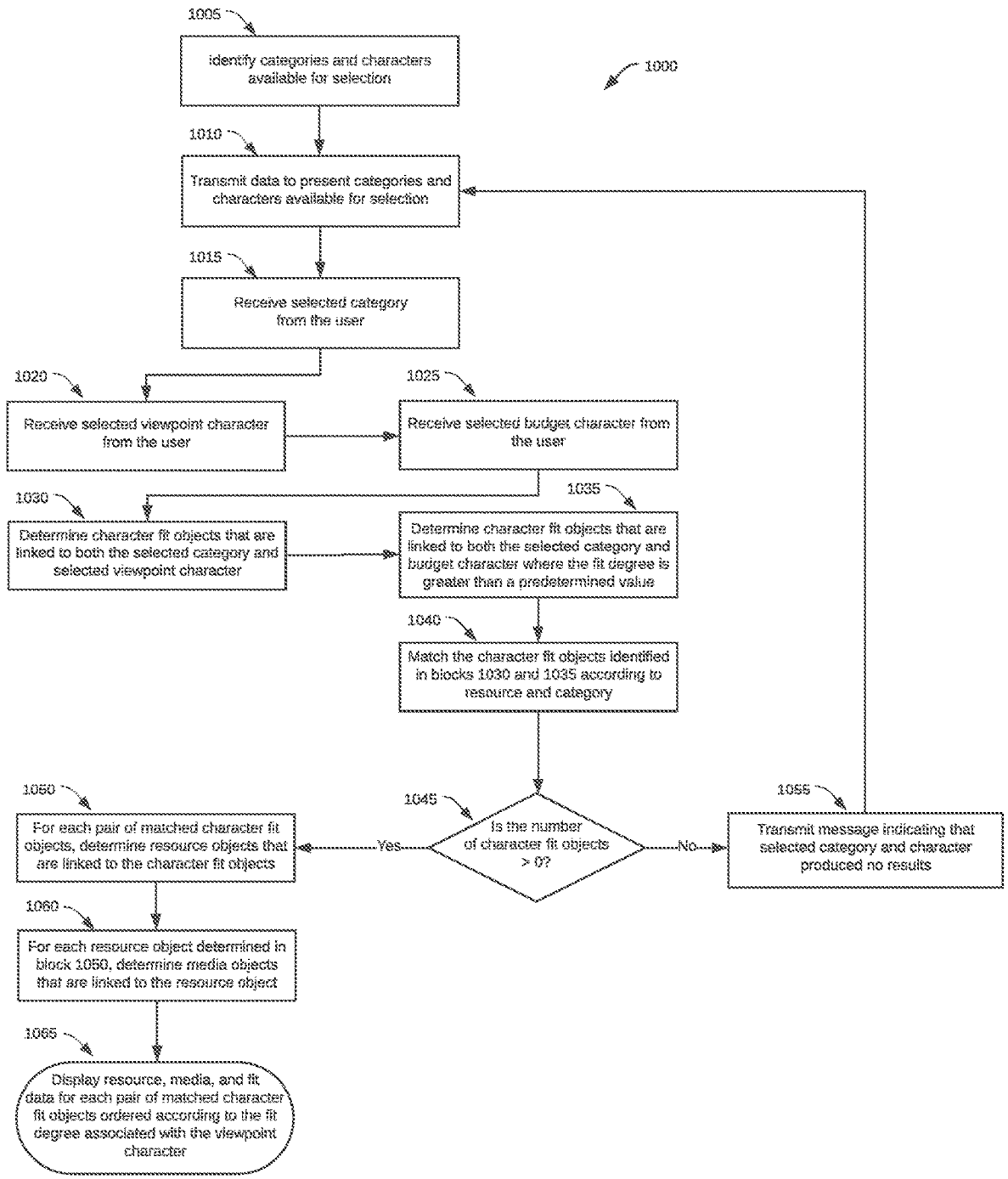
FIG. 10 shows a flowchart for an example resource data processing service involving a viewpoint character and a budget character

FIG. 10 shows a flowchart 1000 for an example resource data processing service involving a viewpoint character and a budget character.

At block 1005, categories and characters available for selection can be identified. As an example, instances of category objects 230 with a status property of "active" can be identified along with instances of character objects 210 with a character type property of "viewpoint" or "budget" and a status property of "active."

At block 1010, data can be transmitted to present categories and characters available for a user to select. In some embodiments, the categories can be presented by displaying a category name and/or category icon and the characters can be presented by displaying a character label and/or a character icon.

At block 1015, a selected category can be received from the user. At block 1020, a selected viewpoint character can be received from the user. At block 1025, a selected budget character can be received from the user. In some embodiments, blocks 1020 and 1025 may come before block 1015, so that the viewpoint character and budget character are selected before the category.

At block 1030, character fit objects 240 that are linked to both the selected category and selected viewpoint character may be determined.

At block 1035, character fit objects 240 that are linked to both the selected category and selected budget character where fit_degree is greater than a predetermined value may be determined.

At block 1040, the character fit objects 240 identified in block 1030 can be matched with the character fit objects 240 identified in block 1035 according to their resource and category properties to form character fit object pairs (i.e. pairs of character objects that include one character object linked to the selected viewpoint character and another character object linked to the selected budget character where both character objects have the same resource and category properties).

At block 1045, it can be determined whether the number of matched character fit object pairs determined in block 1040 is greater than 0. If the number of matched character fit object pairs is not greater than 0 (i.e. there were no matches among the character fit objects based on fit_resources and fit_categories), block 1045 can proceed to block 1055. If the number of matched character fit objects is greater than 0, block 1045 can proceed to block 1050.

At block 1055, a message indicating that the selected category and selected character produced no results can be transmitted to the user. Block 1055 can proceed to block 1010.

At block 1050, for each pair of character fit objects 240 identified in block 1040, resource objects that are linked to the character fit objects in each pair of character fit objects 240 may be determined.

At block 1060, for each resource object 220 identified in block 1050, media objects that are linked to the resource object may be determined.

At block 1065, resource, media, and fit data associated with each pair of character fit objects determined in block 1040 may be displayed and the character fit objects can be ordered according to the fit degree associated with the viewpoint character.

Figure 11:
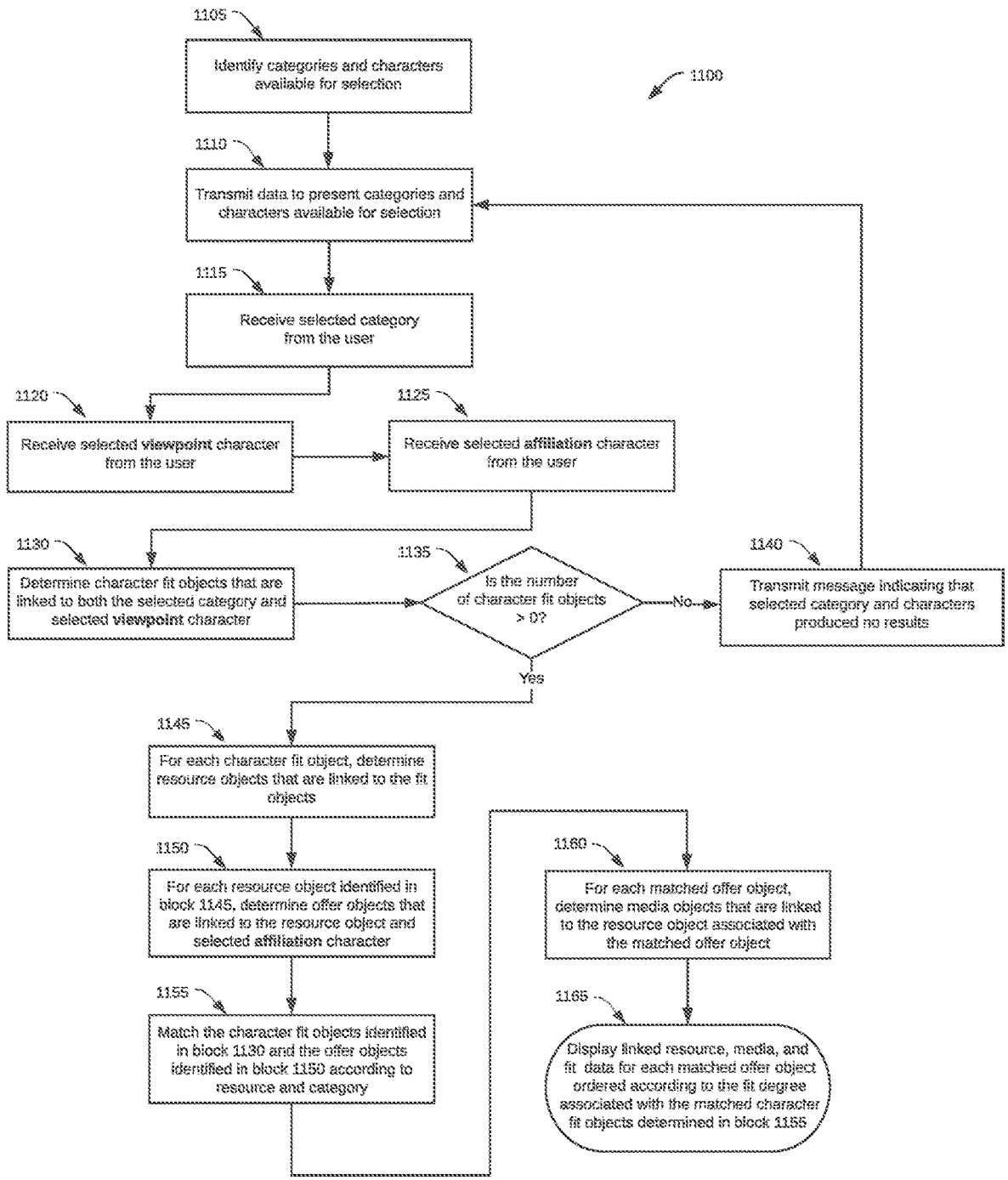
FIG. 11 shows a flowchart for an example resource data processing service involving a viewpoint character and an affiliation character

FIG. 11 shows a flowchart 1100 for an example resource data processing service involving a viewpoint character and an affiliation character At block 1105, categories and characters available for selection can be identified. As an example, instances of category objects 230 with a status property of "active" can be identified along with instances of character objects 210 with a character type property of "viewpoint" or "affiliation" and a status property of "active."

At block 1110, data can be transmitted to present categories and characters available for a user to select. In some embodiments, the categories can be presented by displaying a category name and/or category icon and the characters can be presented by displaying a character label and/or a character icon.

At block 1115, a selected category can be received from the user. At block 1120, a selected viewpoint character can be received from the user. At block 1125, a selected affiliation character can be received from the user. In some embodiments, blocks 1120 and 1125 may come before block 1115, so that the viewpoint character and budget character are selected before the category.

At block 1130, character fit objects 240 that are linked to both the selected category and selected viewpoint character may be determined.

At block 1135, it can be determined whether the number of character fit objects determined in block 1130 is greater than 0. If the number of character fit objects is not greater than 0, block 1135 can proceed to block 1140. If the number of matched character fit objects is greater than 0, block 1135 can proceed to block 1145.

At block 1140, a message indicating that the selected category and selected character produced no results can be transmitted to the user. Block 1140 can proceed to block 1110.

At block 1145, for each character fit object 240 identified in block 1130, resource objects that are linked to the character fit object may be determined.

At block 1150, for each resource objects 220 identified in block 1145, offer objects 260 that are linked to the resource object 220 (e.g. offer resources indicates the resource object) and linked to the selected affiliation character received in block 1125 (e.g. offer characters indicates the selected affiliation character) may be determined.

At block 1155, the character fit objects 240 identified in block 1130 may be matched with the offer objects 260 identified in block 1150 according to their resource and category properties.

At block 1160, for each matched offer object 260 identified in block 1155, media objects that are linked to the resource objects associated with the matched offer object may be determined.

At block 1165, resource, media, and fit data associated with each matched offer object determined in block 1155 may be displayed and the offer objects can be ordered according to the fit degree associated with the matched character fit objects determined in block 1155.

In some embodiments, affiliation character object instances can include an instance corresponding to "AllRetailCustomers," which may include all retail customers to whom regular retail offers are made available. For example, if "AllRetailCustomers" is selected as an affiliation character and RESTAURANTS is selected as a category, results may include all restaurant resources that are available to regular retail customers. As another example, if "TarrytownResident" and "AllRetailCustomers" are selected as affiliation characters and RESTAURANTS is selected as a category, results may include all restaurant resources that are available to regular retail customers as well as restaurant offers available only to Tarrytown residents. As another example, if "TarrytownResident" is selected as an affiliation character (excluding "AllRetailCustomers") and RESTAURANTS is selected as a category, results may include only restaurant offers available exclusively to Tarrytown residents (restaurant resources available to regular retail customers being excluded).

With reference to FIGS. 8, 9, 10, and 11, in some embodiments, ordering objects according to fit degree can be accompanied by filtering the objects based on fit degree (e.g. removing objects that have a fit degree above or below a predetermined value). In other embodiments, filtering can be performed instead of sorting.

Processing Tasks

Figure 12:
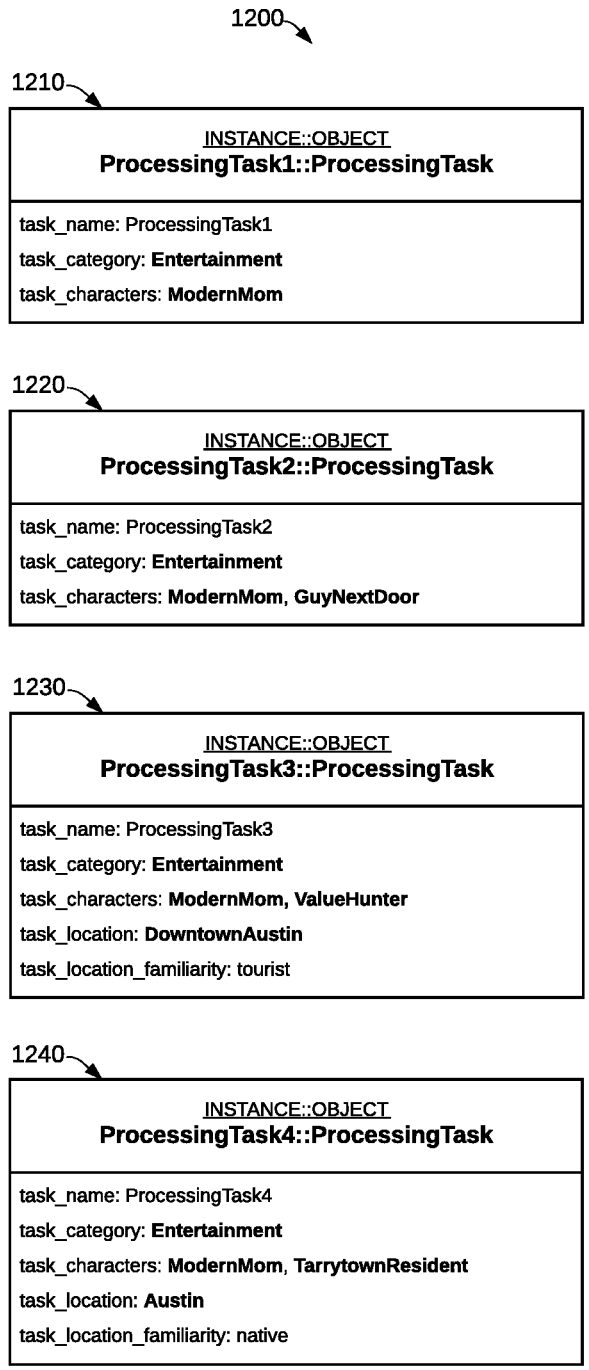
FIG. 12 shows example instances of a processing task object

FIG. 12 shows example instances of a processing task object, including instances "ProcessingTask1" 1210, "ProcessingTask2" 1220, "ProcessingTask3" 1230, and "ProcessingTask4" 1240.

Processing task 1210 represents a processing task with a task_name of "ProcessingTask1," task categories comprising Entertainment, and task_characters comprising viewpoint character ModernMom.

Processing task 1220 represents a processing task with a task_name of "ProcessingTask2," task categories comprising Entertainment, and task_characters comprising viewpoint character ModernMom and viewpoint character GuyNextDoor.

Processing task 1230 represents a processing task with a task_name of "ProcessingTask3," task categories comprising Entertainment, task_characters comprising viewpoint character ModernMom and budget character ValueHunter, task_location comprising DowntownAustin, and a task_location_familiarity of "tourist."

Processing task 1240 represents a processing task with a task_name of "ProcessingTask4," task categories comprising Entertainment, task characters comprising viewpoint character ModernMom and affiliation character Tarrytown-Resident, task_location comprising Austin, and a task_location_familiarity of "native."

Composite Fit

Some embodiments may employ methods of combining fit degrees do not consider human dynamics (e.g. simply averaging multiple fit degrees). Other embodiments may take into account human psychology when converting multiple fit degrees into a composite fit degree. For example, a restaurant that is a GREAT FIT for Person A and a DEFINITE MISMATCH for Person B, will not necessarily be the average of these two fit degrees when viewed from the perspective of Person A and Person B as a whole (a single unit). If Person B intensely dislikes the restaurant in question, Person A's intense love for the restaurant will not make the restaurant a good match for the couple; Person B will be displeased throughout the entire meal, and Person A will likely not be able to enjoy the restaurant (assuming Person A has an ordinary level of empathy).

FIG. 13 shows a block diagram illustrating example models for combining three individual fit degrees into a single composite fit degree that reflects human dynamics.

The first row illustrates the combination of a GOOD FIT 715, a first PERFECT FIT 705, and a second PERFECT FIT 705 into a composite fit degree of GREAT FIT 710.

The second row illustrates the combination of a GOOD FIT 715, a PERFECT FIT 705, and a GREAT FIT 710 into a composite fit degree of GREAT FIT 710.

The third row illustrates the combination of a GOOD FIT 715, a PERFECT FIT 705, and a GOOD FIT 715 into a composite fit degree of GREAT FIT 710.

The fourth row illustrates the combination of a GOOD FIT 715, a PERFECT FIT 705, and a OK FIT 720 into a composite fit degree of GOOD FIT 715.

The fifth row illustrates the combination of a GOOD FIT 715, a PERFECT FIT 705, and a POTENTIAL FIT 705 into a composite fit degree of GOOD FIT 715.

The sixth row illustrates the combination of a GOOD FIT 715, a PERFECT FIT 705, and a NEUTRAL FIT 730 into a composite fit degree of GOOD FIT 715.

The seventh row illustrates the combination of a GOOD FIT 715, a PERFECT FIT 705, and a SLIGHT MISMATCH 735 into a composite fit degree of POTENTIAL FIT 725.

The eighth row illustrates the combination of a GOOD FIT 715, a PERFECT FIT 705, and a DEFINITE MISMATCH 740 into a composite fit degree of SLIGHT MISMATCH 735.

The ninth row illustrates the combination of a GOOD FIT 715, a PERFECT FIT 705, and a CLASH 745 into a composite fit degree of DEFINITE MISMATCH 740.

The combinations and composite fit degrees shown in FIG. 13 are for exemplary purposes only and illustrate only a small range of combinations. In other embodiments, individual fit degrees could be mapped to different composite fit degrees, and a different number of individual fit degrees could be mapped to composite fit degrees Character-Ready Categories Traditional categories—those that do not contemplate the use of character objects—may be defined to comprise a limited number of subcategories because those particular subcategories may be the only categories that appeal to a large number of users with different viewpoints. For example, a traditional "entertainment" category may be defined to comprise only movies, music, and television because users of nearly all viewpoints find movies, music, and television to be entertaining. In some embodiments, some or all of the category objects 230 are traditional, character-blind categories (i.e. the categories are not defined with character objects in mind but nonetheless may be used effectively with character objects). In other embodiments, some or all of the category objects 230 are character-ready (i.e. the categories are defined with character objects in mind).

FIG. 14 shows a block diagram illustrating an example character-ready ENTERTAINMENT instance 1400 of a category object 230 that contemplates the use of INTELLECTUAL, GUY NEXT DOOR, and MODERN MOM characters. In addition to the movies, music, and television subcategories 1440 found in a traditional "entertainment" category, ENTERTAINMENT instance 1400 includes non-traditional entertainment subcategories, such art galleries 1410, bars 1420, professional sports events 1460, museums 1430, tailgating 1450, and amusement parks 1470 because INTELLECTUAL, GUY NEXT DOOR, or MODERN MOM may consider some resources in one or more of these non-traditional subcategories to be a positive fit for what they view as "entertainment."

For example, in addition to the movies, music, and television subcategories 1440 found in a traditional "entertainment" category, an INTELLECTUAL may consider some resources in the subcategories art galleries 1410, bars 1420, and museums 1430 to be a positive fit for what she views as "entertainment." Likewise, in addition to the movies, music, and television subcategories 1440, a GUY NEXT DOOR may consider some resources in the subcategories bars 1420, professional sports events 1460, and tailgating 1450 to be a positive fit for what he views as "entertainment." Similarly, in addition to the movies, music, and television subcategories 1440, a MODERN MOM may consider some resources in the subcategories museums 1430, tailgating 1450, and amusement parks 1470 to be a positive fit for what she views as "entertainment."

In this example, only INTELLECTUAL considers some resources in the subcategory art galleries 1410 to be a positive fit for what she views as "entertainment," only GUY NEXT DOOR considers some resources in the subcategory professional sports 1460 events to be a positive fit for what he views as "entertainment," and only MODERN MOM considers some resources in the subcategory amusement parks 1470 to be a positive fit for what she views as "entertainment." Further, INTELLECTUAL and MODERN MOM both consider some resources in the subcategory museums 1430 to be a positive fit for their views of "entertainment," GUY NEXT DOOR and MODERN MOM both consider some resources in the subcategory tailgating 1450 to be a positive fit for their views of "entertainment," and INTELLECTUAL and GUY NEXT DOOR both consider some resources in the subcategory bars 1420 to be a positive fit for their views "entertainment."

With character-ready categories, when a character is selected, the character fit objects associated with the character can by their nature facilitate processing resources efficiently according to degree of fit. For example, a user who is looking for entertainment for his children may create a processing task to be handled by the data processing service illustrated in FIG. 8. In this example, after the user selects a character-ready ENTERTAINMENT category as the selected category and MODERN MOM as the selected character, character fit objects that are linked to both the selected category and selected character may be determined. Resource, media, and fit data for each character fit object can be displayed with character fit objects ordered according to their fit degree property. Because resources in the subcategories of professional sports events, bars, and art galleries tend not to be good fits for MODERN MOM, they will naturally tend to correspond to character fit instances with low or negative degrees of it. Because resources in the subcategories of museums, amusement parks, tailgating, movies, music, and television do tend to be good fits for MODERN MOM, they will naturally tend to correspond to character fit instances with positive degrees of it. When the character fit instances for all kinds of resources in the character-ready ENTERTAINMENT category are sorted, resources in the subcategories of museums, amusement parks, tailgating, movies, music, and television will tend to appear before resources in the subcategories of professional sports events, bars, and art galleries 1410.

As shown in FIG. 14, broad character-ready categories can permit efficient processing and presentation of data processing tasks. For example, character-ready categories can allow an intellectual looking for entertaining things to do to simultaneously search for art galleries, bars, museums, movies, music, and television simply by selecting the character-ready category 1400 (step 1) and the INTELLECTUAL character instance (step 2). If narrower character-blind categories were employed, an intellectual would be required to search for art galleries 1410 (step 1), search for bars 1420 (step 2), search for museums 1430 (step 3), and search for traditional entertainment (movies, music, and television) 1440 (step 4), combine the search results (step 5), and sort the search results (step 6).

The categories and subcategories shown in FIG. 14 are for example purposes only. Character-ready and character-blind categories can be defined to include subcategories that are different from those shown.

Benefits

Using character objects and character fit objects for resource data processing tasks results in several improvements and benefits.

Because the disclosed resource data processing system can take into account viewpoint, the number of objects processed, as well as the number of results returned to users, can be significantly smaller than those processed and returned by systems that do not consider viewpoint. In viewpoint-blind systems, a large number of results must be returned in order to satisfy large groups of users with different viewpoints; a user must sift through a large number of irrelevant results in order to find items that match the user's viewpoint. In the disclosed system, after a viewpoint character is selected, character fit objects can be limited to those linked to the selected viewpoint character, resulting in more efficient and faster processing and more relevant and focused results for users to review.

Character objects allow resource objects to be processed without the use of personally identifiable information. A user selects a character instead of providing personal information or allowing his or her online communications and behavior to be tracked.

Character objects allow users to track the reliability of a character fit determinations over time. Accountability is enhanced because, if a particular character provides bad fit information repeatedly, users will no longer select the character and may abandon the resource data processing system that featured the unreliable character.

Viewpoint character object instances allow users to process resource data based on a particular viewpoint or a combination of viewpoints. A user can select a viewpoint character who is demographically similar to the user (e.g. a mother with two young children can select MODERN MOM) or the user can select a character who is unlike the user (e.g. a grandfather can select TRENDSETTER to search for a gift for his granddaughter). In addition, viewpoint characters can be combined together to fine tune a resource data processing task (e.g. an intellectual mother selects both INTELLECTUAL and MODERN MOM as characters and ENTERTAINMENT as the category to identify entertainment options that are appealing to both mother and children). Further, viewpoint characters can be combined together to identify compromises (e.g. if an intellectual brother and a trendsetter sister are looking for a mutually acceptable lunch spot, they can select both INTELLECTUAL and TRENDSETTER as characters and RESTAURANTS as the category).

Additional Implementation Details and Embodiments

Various embodiments of the present disclosure may be a system, a method, and/or a computer program product at any possible technical detail level of integration. The computer program product may include a computer readable storage medium having computer readable program instructions thereon for causing a processor to carry out aspects of the present disclosure.

For example, the functionality described herein may be performed as software instructions being executed by, and/or in response to software instructions being executed by, one or more hardware processors and/or any other suitable computing devices. The software instructions and/or other executable code may be read from a computer readable storage medium (or mediums).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

What is claimed is:

1. A computer system comprising:
one or more computer readable storage devices configured to store:
a plurality of resource objects, wherein each resource object in the plurality of resource objects represents a thing that can be consumed or used by a person or an organization;
a plurality of category objects, wherein each category object in the plurality of category objects groups two or more resource objects together based on one or more attributes shared by the two or more resource objects;
a plurality of character objects, wherein each character object in the plurality of character objects represents a viewpoint held by one or more persons, a budget, or an affiliation;
a plurality of character fit objects, wherein each character fit object in the plurality of character fit objects describes how well a resource object from the plurality of resource objects fits a character object from the plurality of character objects with respect to a category object from the plurality of category objects;
a plurality of computer-readable instructions; and
one or more processors configured to execute the plurality of computer-readable instructions to cause the computer system to perform operations comprising:
receiving from a user a selected category object selected from the plurality of category objects;
receiving from the user a selected character object selected from the plurality of character objects;
identifying a first set of character fit objects from the plurality of character fit objects based on each character fit object in the set of character fit objects being linked to both the selected category object and the selected character object;
ordering the character fit objects in the set of character fit objects according to fit degree; and
for each character fit object in the set of character fit objects:
displaying one or more properties of the character fit object;
identifying one or more resource objects, from the plurality of resource objects, that are linked to the character fit object; and
displaying one or more properties of each of the identified one or more resource objects.

2. A computer system comprising:
one or more computer readable storage devices configured to store:
a plurality of resource objects, wherein each resource object in the plurality of resource objects represents a thing that can be consumed or used by a person or an organization;
a plurality of category objects, wherein each category object in the plurality of category objects groups two or more resource objects together based on one or more attributes shared by the two or more resource objects;
a plurality of character objects, wherein each character object in the plurality of character objects represents a viewpoint held by one or more persons, a budget, or an affiliation;
a plurality of character fit objects, wherein each character fit object in the plurality of character fit objects describes how well a resource object from the plurality of resource objects fits a character object from the plurality of character objects with respect to a category object from the plurality of category objects;
a plurality of computer-readable instructions; and
one or more processors configured to execute the plurality of computer-readable instructions to cause the computer system to perform operations comprising:
receiving from a user a selected category object selected from the plurality of category objects;
receiving from the user a first selected character object selected from the plurality of character objects;
receiving from the user a second selected character object selected from the plurality of character objects;
identifying a first set of character fit objects from the plurality of character fit objects based on each character fit object in the first set of character fit objects being linked to both the selected category object and the first selected character object;

identifying a second set of character fit objects from the plurality of character fit objects based on each character fit object in the second set of character fit objects being linked to both the selected category object and the second selected character object;

identifying a set of matched character fit object pairs by matching fit objects in the first set of character fit objects with fit objects in the second set of character fit objects based on matching resource and category properties;

determining a composite fit degree for each matched character fit object pair in the set of matched character fit object pairs;

ordering the matched character fit object pairs according to their composite fit degrees; and for each matched character fit object pair in the set of matched character fit object pairs:
 displaying one or more properties of the matched character fit object pair;
 identifying one or more resource objects, from the plurality of resource objects, that are linked to the matched character fit object pair; and
 displaying one or more properties of each of the identified one or more resource objects.

3. A computer system comprising:
one or more computer readable storage devices configured to store:
 a plurality of resource objects, wherein each resource object in the plurality of resource objects represents a thing that can be consumed or used by a person or an organization;
 a plurality of category objects, wherein each category object in the plurality of category objects groups two or more resource objects together based on one or more attributes shared by the two or more resource objects;
 a first plurality of character objects;
 a second plurality of character objects, wherein each character object in both the first plurality of character objects and the second plurality of character objects represents a viewpoint held by one or more persons, a budget, or an affiliation;
 a plurality of character fit objects, wherein each character fit object in the plurality of character fit objects describes how well a resource object from the plurality of resource objects fits a character object from either the first plurality of character objects or the second plurality of character objects with respect to a category object from the plurality of category objects;
 a plurality of computer-readable instructions; and
one or more processors configured to execute the plurality of computer-readable instructions to cause the computer system to perform operations comprising:
 receiving from a user a selected category object selected from the plurality of category objects;
 receiving from the user a first selected character object selected from the first plurality of character objects;
 receiving from the user a second selected character object selected from the second plurality of character objects;
 identifying a first set of character fit objects from the plurality of character fit objects based on each character fit object in the first set of character fit objects being linked to both the selected category object and the first selected character object;

identifying a second set of character fit objects from the plurality of character fit objects based on each character fit object in the second set of character fit objects being linked to both the selected category object and the second selected character object and having a fit degree that is greater than a predefined value;

identifying a set of matched character fit object pairs by matching fit objects in the first set of character fit objects with fit objects in the second set of character fit objects based on matching resource and category properties;

ordering the matched character fit object pairs according to a fit degree associated with a character fit object in the matched character fit object pairs, wherein the character fit object in the matched character fit object pairs is associated with the first set of character fit objects; and for each matched character fit object pair in the set of matched character fit object pairs:
 displaying one or more properties of the matched character fit object pair;
 identifying one or more resource objects, from the plurality of resource objects, that are linked to the matched character fit object pair; and
 displaying one or more properties of each of the identified one or more resource objects.

4. A computer system comprising:
one or more computer readable storage devices configured to store:
 a plurality of resource objects, wherein each resource object in the plurality of resource objects represents a thing that can be consumed or used by a person or an organization;
 a plurality of category objects, wherein each category object in the plurality of category objects groups two or more resource objects together based on one or more attributes shared by the two or more resource objects;
 a first plurality of character objects;
 a second plurality of character objects, wherein each character object in both the first plurality of character objects and the second plurality of character objects represents a viewpoint held by one or more persons, a budget, or an affiliation;
 a plurality of character fit objects, wherein each character fit object in the plurality of character fit objects describes how well a resource object from the plurality of resource objects fits a character object from either the first plurality of character objects or the second plurality of character objects with respect to a category object from the plurality of category objects;
 a plurality of offer objects;
 a plurality of computer-readable instructions; and
one or more processors configured to execute the plurality of computer-readable instructions to cause the computer system to perform operations comprising:
 receiving from a user a selected category object selected from the plurality of category objects;
 receiving from the user a first selected character object selected from the first plurality of character objects;
 receiving from the user a second selected character object selected from the second plurality of character objects;

identifying a set of character fit objects from the plurality of character fit objects based on each character fit object in the set of character fit objects being linked to both the selected category object and the first selected character object;

identifying a set of resource objects from the plurality of resource objects based on each resource object in the set of resource objects being linked to a character fit object in the set of character fit objects;

identifying a set of offer objects from the plurality of offer objects based on each offer object in the set of offer objects being linked to a resource object in the set of resource objects and to the second selected character;

identifying a second set of character fit objects comprising character fit objects from the first set of character fit objects that match offer objects in the set of offer objects based on matching resource and category properties;

ordering the second set of character fit objects according to fit degree;

for each character fit object in the second set of character fit objects:
- displaying one or more properties of the character fit object;
- identifying one or more resource objects, from the plurality of resource objects, that are linked to the character fit object; and
- displaying one or more properties of each of the identified one or more resource objects.

* * * * *